(12) United States Patent
Grodzins et al.

(10) Patent No.: US 10,656,304 B2
(45) Date of Patent: May 19, 2020

(54) BACKSCATTER CHARACTERIZATION USING INTERLINEARLY ADAPTIVE ELECTROMAGNETIC X-RAY SCANNING

(71) Applicant: American Science and Engineering, Inc., Billerica, MA (US)

(72) Inventors: Lee Grodzins, Lexington, MA (US); Dan-Cristian Dinca, Chelmsford, MA (US); Martin Rommel, Lexington, MA (US)

(73) Assignee: American Science and Engineering, Inc., Billerica, MA (US)

( * ) Notice: Subject to any disclaimer, the term of this patent is extended or adjusted under 35 U.S.C. 154(b) by 164 days.

(21) Appl. No.: 15/758,184

(22) PCT Filed: Sep. 7, 2016

(86) PCT No.: PCT/US2016/050467
§ 371 (c)(1),
(2) Date: Mar. 7, 2018

(87) PCT Pub. No.: WO2017/044441
PCT Pub. Date: Mar. 16, 2017

(65) Prior Publication Data
US 2018/0252841 A1    Sep. 6, 2018

Related U.S. Application Data

(60) Provisional application No. 62/216,783, filed on Sep. 10, 2015.

(51) Int. Cl.
*G01V 5/00* (2006.01)
*G01N 23/20008* (2018.01)
(Continued)

(52) U.S. Cl.
CPC ..... *G01V 5/0025* (2013.01); *G01N 23/20008* (2013.01); *G21K 1/02* (2013.01); *G01N 2223/639* (2013.01); *H01J 35/14* (2013.01)

(58) Field of Classification Search
CPC ....... G01N 2223/639; G01N 23/20008; G01V 5/0025; G21K 1/02; H01J 35/14
See application file for complete search history.

(56) References Cited

U.S. PATENT DOCUMENTS

| | | | |
|---|---|---|---|
| 2,569,872 | A | 10/1951 | Skehan |
| 2,825,817 | A | 3/1958 | North |

(Continued)

FOREIGN PATENT DOCUMENTS

| | | |
|---|---|---|
| CN | 1161103 | 10/1997 |
| CN | 1441914 A | 9/2003 |

(Continued)

OTHER PUBLICATIONS

International Search Report for PCT/US2016/050467, dated Dec. 15, 2016.

(Continued)

*Primary Examiner* — Marcus H Taningco
(74) *Attorney, Agent, or Firm* — Novel IP

(57) ABSTRACT

Methods and an x-ray source for sweeping an x-ray beam across an object of inspection. A beam of electrons is emitted by a cathode, while a sweep controller applies a signal to a beam controller in a prescribed path on an anode, thereby causing an x-ray beam to be emitted from an aperture disposed at one apex of a snout of variable length. The aperture may be a Rommel aperture that allows for forming a scanning x-ray of desired size and flux independently of the angle at which the beam is emitted. Scanning rate may be varied during the course of a scan. Multiple x-ray beams may be formed simultaneously, where one beam is inside a (Continued)

conveyance while the other is outside the conveyance, for example.

21 Claims, 13 Drawing Sheets

(51) Int. Cl.
*G21K 1/02* (2006.01)
*H01J 35/14* (2006.01)

(56) References Cited

U.S. PATENT DOCUMENTS

| | | | |
|---|---|---|---|
| 3,114,832 A | 12/1963 | Alvarez |
| 3,894,234 A | 7/1975 | Mauch |
| 4,045,672 A | 8/1977 | Watanabe |
| 4,079,259 A | 3/1978 | Blum |
| 4,274,005 A | 6/1981 | Yamamura |
| 4,433,427 A | 2/1984 | Barnea |
| 4,769,829 A | 9/1988 | Webb |
| 4,982,096 A | 1/1991 | Fujii |
| 5,038,370 A | 8/1991 | Harding |
| 5,091,924 A | 2/1992 | Bermbach |
| 5,164,976 A | 11/1992 | Scheid |
| 5,481,584 A | 1/1996 | Tang |
| 5,493,596 A | 2/1996 | Annis |
| 5,600,303 A | 2/1997 | Husseiny |
| 5,764,683 A | 6/1998 | Swift |
| 5,822,395 A | 10/1998 | Schardt |
| 5,910,973 A | 6/1999 | Grodzins |
| 5,940,468 A | 8/1999 | Huang |
| 5,968,425 A | 10/1999 | Bross |
| 6,067,344 A | 5/2000 | Grodzins |
| 6,081,580 A | 6/2000 | Grodzins |
| 6,151,381 A | 11/2000 | Grodzins |
| 6,192,104 B1 | 2/2001 | Adams |
| 6,249,567 B1 | 6/2001 | Rothschild |
| 6,282,260 B1 * | 8/2001 | Grodzins ............... G01N 23/20 378/137 |
| 6,292,533 B1 | 9/2001 | Swift |
| 6,320,933 B1 | 11/2001 | Grodzins |
| 6,356,620 B1 | 3/2002 | Rothschild |
| 6,421,420 B1 | 7/2002 | Grodzins |
| 6,424,695 B1 | 7/2002 | Grodzins |
| 6,453,007 B2 | 9/2002 | Adams |
| 6,459,761 B1 | 10/2002 | Grodzins |
| 6,459,764 B1 | 10/2002 | Chalmers |
| 6,542,580 B1 | 4/2003 | Carver |
| 6,546,072 B1 | 4/2003 | Chalmers |
| 6,658,087 B2 | 12/2003 | Chalmers |
| 6,870,975 B1 | 3/2005 | Morison |
| 7,010,094 B2 | 3/2006 | Grodzins |
| 7,072,440 B2 | 7/2006 | Mario |
| 7,099,434 B2 | 8/2006 | Adams |
| 7,110,493 B1 | 9/2006 | Kotowski |
| RE39,396 E | 11/2006 | Swift |
| 7,218,704 B1 | 5/2007 | Adams |
| 7,400,701 B1 | 7/2008 | Cason |
| 7,409,042 B2 | 8/2008 | Bertozzi |
| 7,505,556 B2 | 3/2009 | Chalmers |
| 7,505,562 B2 | 3/2009 | Dinca |
| 7,526,064 B2 | 4/2009 | Akery |
| 7,538,325 B2 | 5/2009 | Mishin |
| 7,555,099 B2 | 6/2009 | Rothschild |
| 7,561,666 B2 | 7/2009 | Annis |
| 7,593,506 B2 | 9/2009 | Cason |
| 7,593,510 B2 | 9/2009 | Rothschild |
| 7,688,937 B2 | 3/2010 | Schomberg |
| 7,860,213 B2 | 12/2010 | Akery |
| 7,864,920 B2 | 1/2011 | Rothschild |
| 7,995,707 B2 | 8/2011 | Rothschild |
| 8,170,177 B2 | 5/2012 | Akery |
| 8,275,092 B1 | 9/2012 | Zhang |
| 8,325,871 B2 | 12/2012 | Grodzins |
| 8,345,819 B2 | 1/2013 | Mastronardi |
| 8,439,565 B2 | 5/2013 | Mastronardi |
| 8,442,186 B2 | 5/2013 | Rothschild |
| 8,457,274 B2 | 6/2013 | Arodzero |
| 8,457,275 B2 | 6/2013 | Akery |
| 8,503,606 B2 | 8/2013 | Rothschild |
| 8,532,823 B2 | 9/2013 | McElroy |
| 8,576,989 B2 | 11/2013 | Kaminski |
| 8,690,427 B2 | 4/2014 | Mastronardi |
| 8,824,632 B2 | 9/2014 | Mastronardi |
| 8,837,670 B2 | 9/2014 | Akery |
| 8,842,808 B2 | 9/2014 | Rothschild |
| 8,861,684 B2 | 10/2014 | Al-Kofahi |
| 8,884,236 B2 | 11/2014 | Rothschild |
| 8,903,045 B2 | 12/2014 | Schubert |
| 8,923,481 B2 | 12/2014 | Schubert |
| 8,971,487 B2 | 3/2015 | Mastronardi |
| 9,014,339 B2 | 4/2015 | Grodzins |
| 9,020,103 B2 | 4/2015 | Grodzins |
| 9,052,271 B2 | 6/2015 | Grodzins |
| 9,057,679 B2 | 6/2015 | Morton |
| 9,086,497 B2 | 7/2015 | Bendahan |
| 9,099,279 B2 | 8/2015 | Rommel |
| 9,117,564 B2 | 8/2015 | Rommel |
| 9,146,201 B2 | 9/2015 | Schubert |
| 9,223,052 B2 * | 12/2015 | Morton ............... G01V 5/0083 |
| 9,257,208 B2 | 2/2016 | Rommel |
| 9,279,901 B2 | 3/2016 | Akery |
| 9,285,488 B2 | 3/2016 | Arodzero |
| 9,291,582 B2 | 3/2016 | Grodzins |
| 9,417,060 B1 | 8/2016 | Schubert |
| 9,442,213 B2 | 9/2016 | Bendahan |
| 9,465,135 B2 | 10/2016 | Morton |
| 9,466,456 B2 | 10/2016 | Rommel |
| 9,535,019 B1 | 1/2017 | Rothschild |
| 9,541,510 B2 | 1/2017 | Arodzero |
| 9,658,343 B2 | 5/2017 | Arodzero |
| 9,823,201 B2 | 11/2017 | Morton |
| 2003/0161434 A1 | 8/2003 | Rand |
| 2003/0235271 A1 | 12/2003 | Rand |
| 2004/0104347 A1 | 6/2004 | Bross |
| 2004/0247075 A1 | 12/2004 | Johnson |
| 2005/0113684 A1 | 5/2005 | Lokhandwalla |
| 2005/0185757 A1 | 8/2005 | Kresse |
| 2005/0236577 A1 | 10/2005 | Katagiri |
| 2006/0078091 A1 | 4/2006 | Lasiuk |
| 2006/0280293 A1 | 12/2006 | Hardesty |
| 2007/0029493 A1 | 2/2007 | Kniss |
| 2007/0069146 A1 | 3/2007 | Neal |
| 2007/0098142 A1 | 5/2007 | Rothschild |
| 2007/0217572 A1 | 9/2007 | Kotowski |
| 2007/0237294 A1 | 10/2007 | Hoff |
| 2008/0089478 A1 | 4/2008 | Hartick |
| 2009/0050812 A1 | 2/2009 | Dunleavy |
| 2009/0086907 A1 | 4/2009 | Smith |
| 2009/0103686 A1 | 4/2009 | Rothschild |
| 2009/0161827 A1 | 6/2009 | Gertner |
| 2009/0186895 A1 | 7/2009 | Teegarden |
| 2009/0245462 A1 * | 10/2009 | Agrawal ............... G01N 23/04 378/57 |
| 2009/0257555 A1 | 10/2009 | Chalmers |
| 2009/0268871 A1 | 10/2009 | Rothschild |
| 2009/0274270 A1 | 11/2009 | Kotowski |
| 2010/0072398 A1 | 3/2010 | Fruehauf |
| 2010/0171052 A1 | 7/2010 | Thoms |
| 2010/0276602 A1 | 11/2010 | Clothier |
| 2011/0079726 A1 | 4/2011 | Kusner |
| 2011/0096973 A1 | 4/2011 | Ding |
| 2011/0103548 A1 | 5/2011 | Bendahan |
| 2011/0309257 A1 | 12/2011 | Menge |
| 2012/0033791 A1 | 2/2012 | Mastronardi |
| 2012/0236990 A1 | 9/2012 | Rothschild |
| 2013/0136230 A1 | 5/2013 | Arodzero |
| 2013/0208857 A1 | 8/2013 | Arodzero |
| 2013/0235977 A1 * | 9/2013 | Grodzins ............... H01J 35/30 378/124 |
| 2014/0010351 A1 | 1/2014 | Rommel |
| 2015/0016589 A1 | 1/2015 | Melman |
| 2015/0185356 A1 | 7/2015 | Tang |

(56) References Cited

U.S. PATENT DOCUMENTS

| | | | |
|---|---|---|---|
| 2015/0369955 A1* | 12/2015 | Al-Hoshani | G01V 5/0016 378/57 |
| 2016/0135278 A1* | 5/2016 | Sun | H05H 7/02 378/57 |
| 2017/0062088 A1* | 3/2017 | Nakayama | G01N 23/223 |
| 2018/0313770 A1 | 11/2018 | Morton | |

FOREIGN PATENT DOCUMENTS

| | | |
|---|---|---|
| CN | 1620616 | 5/2005 |
| CN | 1995993 | 7/2007 |
| CN | 201060275 | 5/2008 |
| CN | 101971054 A | 2/2011 |
| DE | 4003757 A1 | 8/1991 |
| DE | 102005029674 | 12/2006 |
| GB | 2295266 | 5/1996 |
| GB | 2515365 A | 12/2014 |
| JP | S5234689 | 3/1977 |
| JP | H02275400 | 11/1990 |
| JP | H03257391 | 11/1991 |
| JP | H06027249 | 2/1994 |
| JP | H10232284 | 9/1998 |
| JP | H10288671 | 10/1998 |
| JP | H11160444 | 6/1999 |
| JP | H11271453 | 10/1999 |
| JP | 2000506613 | 5/2000 |
| JP | 2000235078 | 8/2000 |
| JP | 2000304865 | 11/2000 |
| JP | 2000346947 | 12/2000 |
| JP | 2001058881 | 3/2001 |
| JP | 2002221578 | 8/2002 |
| JP | 2004033757 | 2/2004 |
| JP | 2005003624 A | 1/2005 |
| JP | 2006510033 | 3/2006 |
| JP | 2010181412 | 8/2010 |
| JP | 2011224341 | 11/2011 |
| JP | 2011227044 | 11/2011 |
| KR | 20070092440 | 9/2007 |
| WO | 2000033060 | 6/2000 |
| WO | 2000037928 | 6/2000 |
| WO | 2002027308 | 4/2002 |
| WO | 2004010127 | 1/2004 |
| WO | 2006047718 | 5/2006 |
| WO | 2008081179 | 7/2008 |
| WO | 2011095810 | 8/2011 |
| WO | 2011115923 | 9/2011 |
| WO | 2011163108 | 12/2011 |
| WO | 2012106730 | 8/2012 |
| WO | 2014143162 A1 | 9/2014 |

OTHER PUBLICATIONS

Wamiq M Ahmed et al: "Historical comparison of vehicles using scanned x-ray images", 2011 IEEE Workshop on Applications of Computer Vision (WACV), Jan. 5, 2011, pp. 288-293.

* cited by examiner

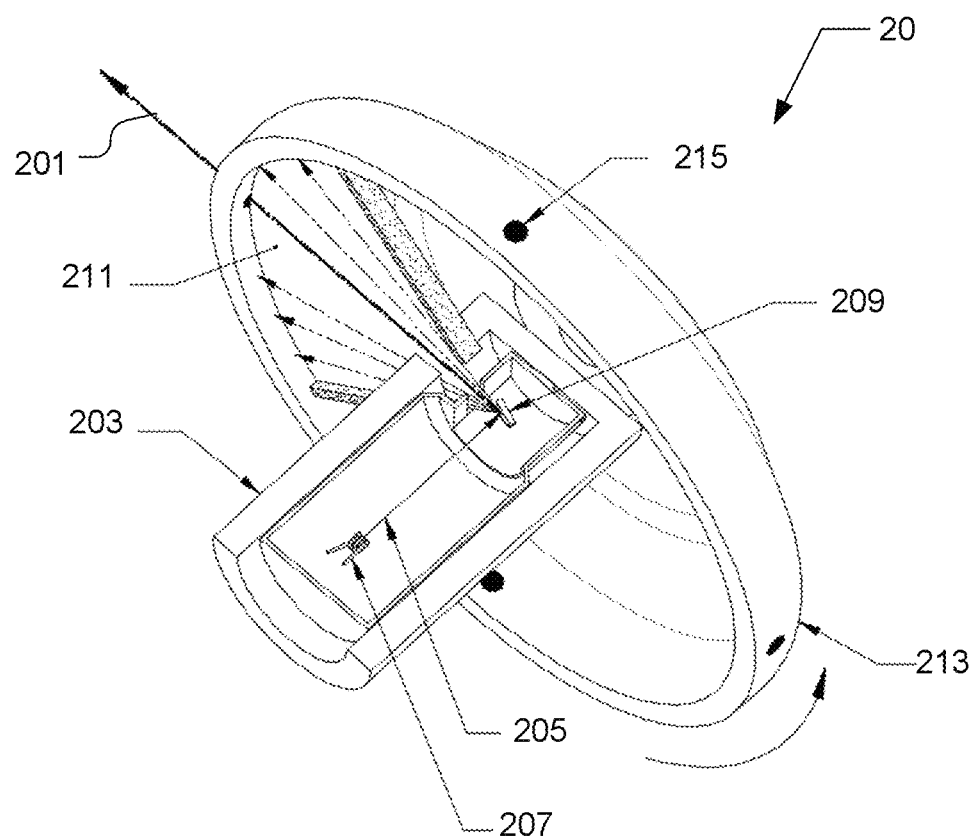
Fig. 2  PRIOR ART
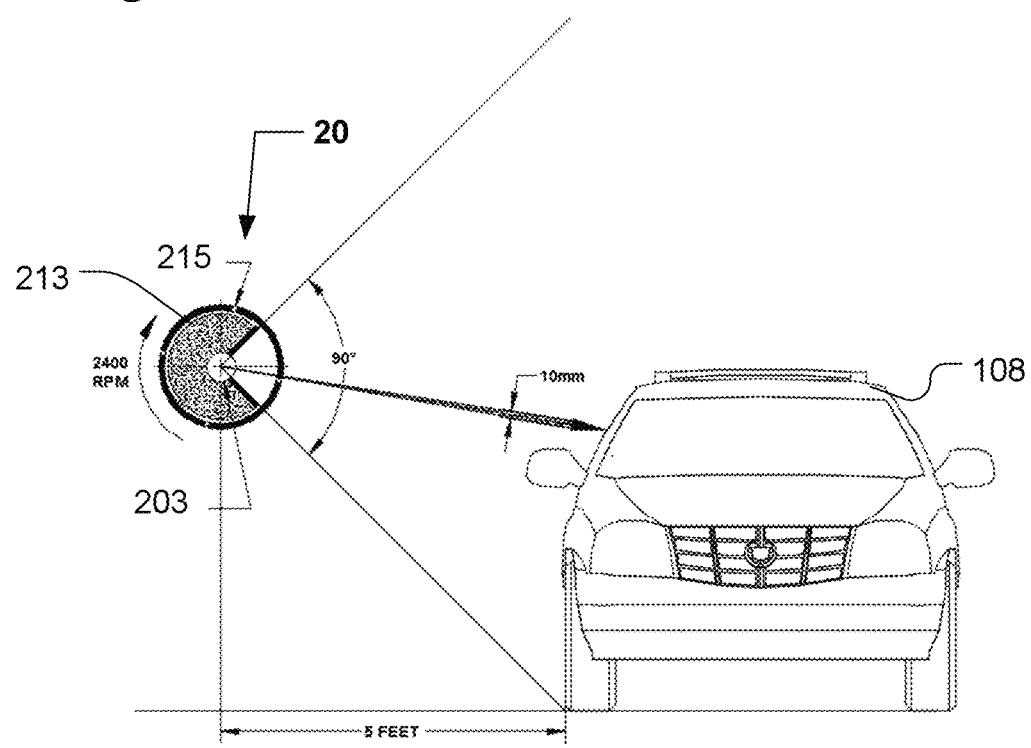
PRIOR ART  Fig. 3

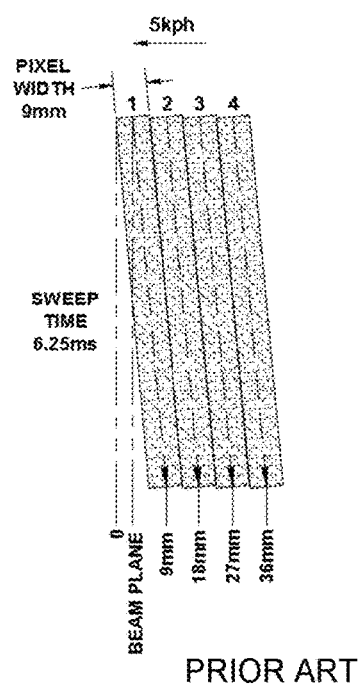 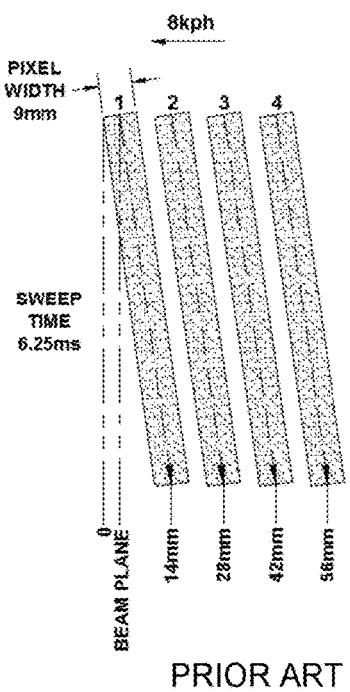 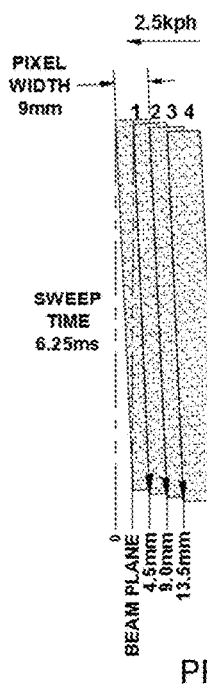
*Fig. 4A*  *Fig. 4B*  *Fig. 4C*

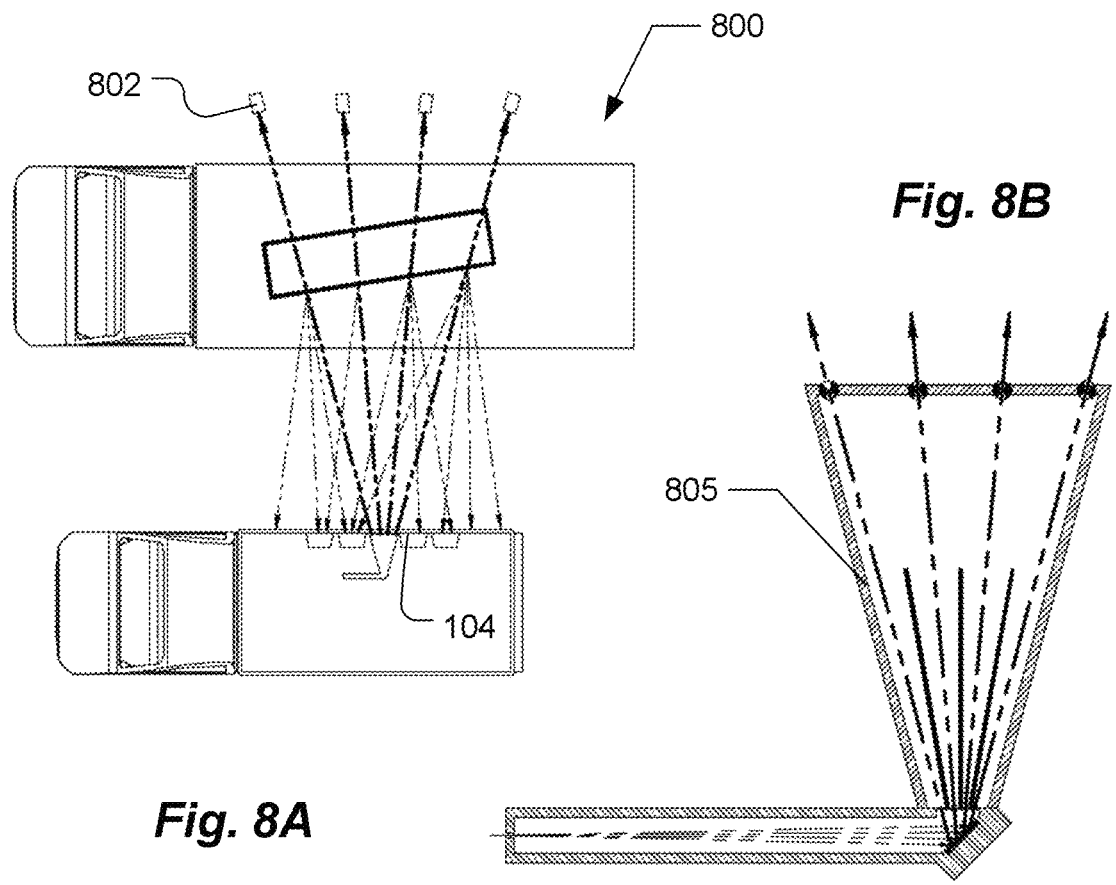
Fig. 8B
Fig. 8A
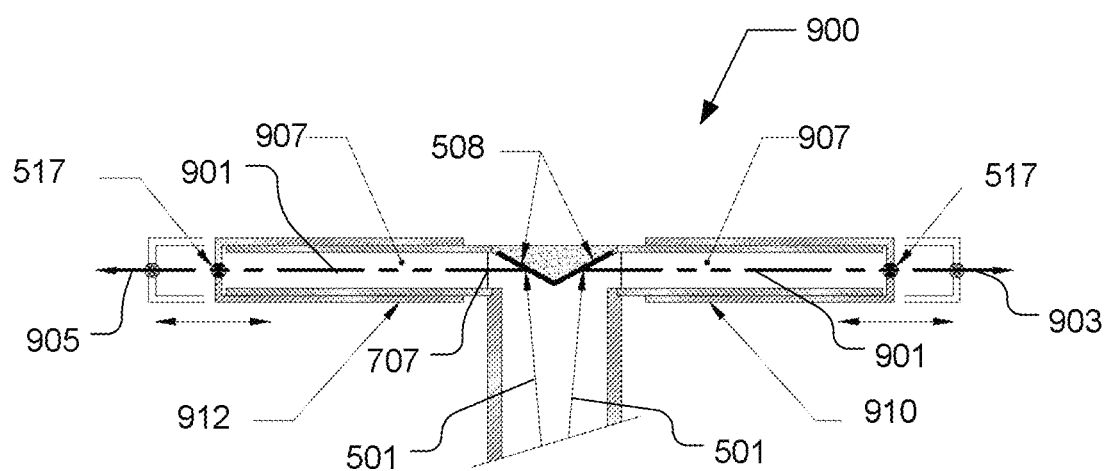
Fig. 9

*Fig. 14A*
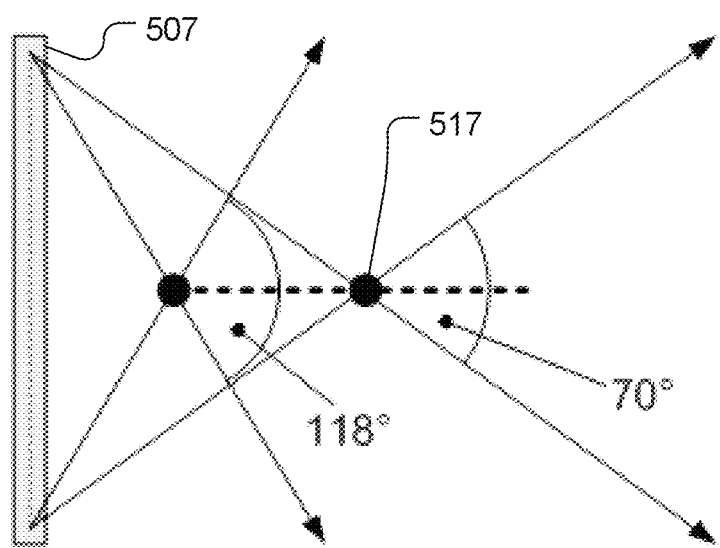
*Fig. 14B*
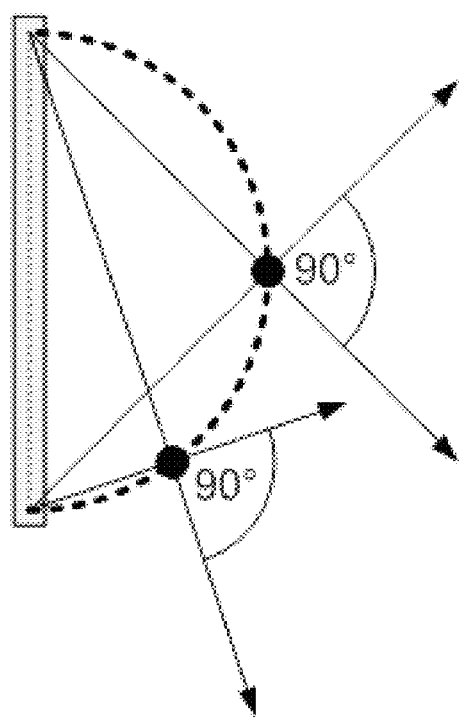
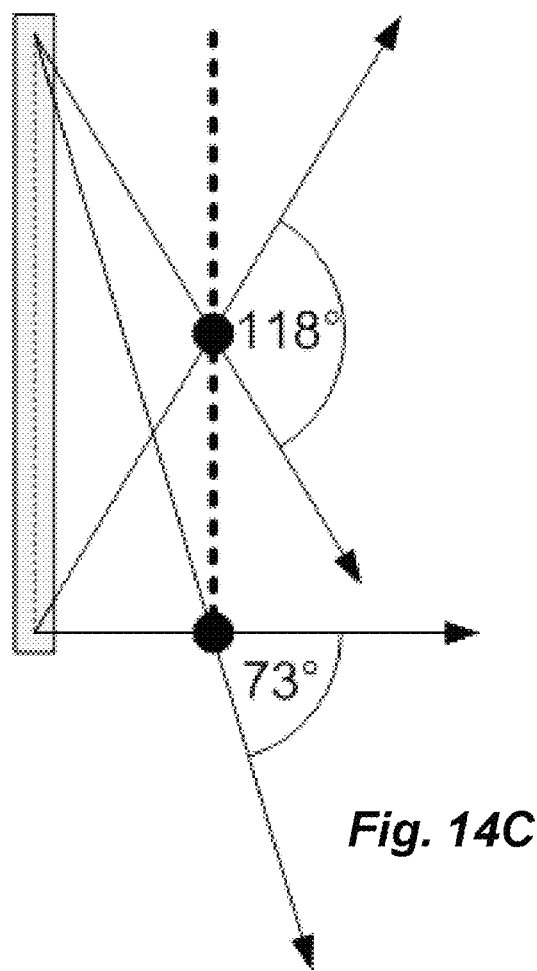
*Fig. 14C*

BACKSCATTER CHARACTERIZATION USING INTERLINEARLY ADAPTIVE ELECTROMAGNETIC X-RAY SCANNING

CROSS REFERENCE

The present application is a 371 National Stage application of PCT/US2016/050467, entitled "Backscatter Characterization Using Interlinearly Adaptive Electromagnetic X-Ray Scanning" and filed on Sep. 7, 2016, which claims the priority of U.S. Provisional Patent Application Ser. No. 62/216,783, filed Sep. 10, 2015, both of which is are incorporated herein by reference in their entirety.

TECHNICAL FIELD

The present invention relates to systems and methods for inspection of items using penetrating radiation, and, more particularly to inspection wherein a characteristic of the penetrating radiation is varied during the course of a single scan.

BACKGROUND OF THE INVENTION

Inspection of vehicles and containers by imaging backscattered radiation has, in the past, used mechanical means to create beams of x-rays that scan the targets. Various schemes for electromagnetically scanning x-ray beams are known as well, as taught, for example, in U.S. Pat. No. 6,249,567 (to Rothschild et al., 2001), which teaches the use of an electromagnetically scanned x-ray beam to scan the undercarriage of a vehicle.

FIG. 1 shows a prior art X-ray backscatter system 100 where a source of x-rays 102 and a set of x-ray backscatter detectors 104 are enclosed within an inspection vehicle 106 that is moving relative to a target 108 (otherwise referred to herein as an "inspection target", an "inspected target" "target vehicle," or "inspected vehicle" (or "car" or "truck," as the case may be). A typical direction of relative motion is indicated by arrow 116, where either the inspection vehicle 106, or the target vehicle 108, or both, may be in motion relative to the surroundings. The basic elements of the backscatter system shown in FIG. 1 include an x-ray beam former 20 (shown in FIG. 2), one or more backscatter x-ray detectors 104, a signal processor 110, and a user interface 112. Source 102 includes beam former 20 (otherwise referred to herein as a "mechanical scanner"), which forms x-rays into a pencil beam 201 (shown in FIG. 2) that is swept in a scanning pattern 114 that is typically in a vertical plane. A prior art beam former is shown in FIG. 2 and designated there generally by numeral 20, and described in detail in U.S. Pat. No. 9,014,339 (hereinafter "Grodzins '339"), which is incorporated herein by reference. Beam former 20 consists of an x-ray tube 203, in which a fixed beam of electrons 205, emitted by a filament 207 at a negative high voltage, is focused to a spot on a reflection anode 209. The x-rays, constrained into a fan beam by a collimator 211, impinge on a rotating hoop 213 that has N equally spaced apertures 215 (N=4 in FIG. 2) that produce pencil beams 201 of x-rays that sweep across the target (vehicle 108 in FIG. 1) N times in each revolution of the hoop 213. The x-rays that are backscattered by Compton interactions in the target vehicle 108 are detected by large-area backscatter detectors whose signals are processed into images as the car (i.e., target vehicle 108) moves through the scanning pencil beam 201.

The specifications of the scanning pencil beam 201—intensity, sweep speed, sweep angle, resolution, etc.—are determined by the parameters of the x-ray tube 203 and mechanical scanner 20. In cases of backscatter systems deployed on inspection vans 106 and used to inspect vehicles 108, as shown in FIG. 1, it is standard practice to design the mechanical scanner (which term is used synonymously herein with the terms "beam former" and "chopper") 20 to give optimal image quality for a specific height of vehicle that moves at a specific drive-by speed and specific distance from the inspection van. Vehicles of other heights or different distances or different speeds will be inspected under less than optimum conditions.

FIG. 3 illustrates a prior art example of less-than-optimal matching of a beam-scanning system to a particular vehicle under inspection. In the prior art scenario depicted in FIG. 3, a stationary inspection-van (not shown), inspects a car (inspected vehicle 108) moving at 5 kph, at a distance of 5 feet from the chopper 20. The prior art chopper hoop 213 of FIG. 2, having a wheel diameter of 24 inches, with four apertures 215 of 1.5 mm diameter each, spins at 40 revolutions per second, creating successive 90° sweeps, each taking 6.25 msec. The 1.5 mm aperture at a distance of 12 inches from the x-ray source produces a 9 mm wide pixel at 5 feet, the minimum distance to inspected vehicle 108. During each sweep of the beam, the inspected vehicle has moved a distance of 8.7 mm, so successive sweeps abut and overlap, such that the car is fully scanned.

FIG. 4A is a beam coverage plot of successive beam sweeps that follow one another as the hoop of FIG. 2 rotates. For heuristic simplicity in making the point of this paragraph, it has been assumed that the pixel width is 9 mm and unchanged during the sweep. In fact, the sweeps may form an hourglass, with pixel widths 40% wider at the top and bottom of the 90° sweeps, for example. The uniform widths of the scanned swaths in each of FIGS. 4A-4C are typical representations of the sweeps on a typical beam former, although that uniformity imposes undesirable limitations for x-ray inspection applications, as will now be discussed.

Using the values that have been discussed above for purposes of demonstration, the pixel width is always greater than the distance of 8.7 mm (rounded to 9 mm in FIG. 4A) that the car moves during an inspection. The car is fully scanned. At a higher speed, 8 kph, for example, the car moves almost 13 mm during each sweep so that the pixel pattern shown in FIG. 4B has gaps. The car is seriously under-sampled. FIG. 4C shows the pattern for a van speed of 2.5 kph. (The vertical offset of the scans as shown is for illustrative purposes only.) In the latter case, the beam width is at least twice the distance the vehicle has moved in a sweep and successive scans fully overlap. The oversampling by a factor of two improves the statistics of the measured intensities but at a cost of doubling the time of an inspection. Under-sampling or oversampling also results when the car, moving at 5 kph, is closer or further from the inspection van.

It is to be noted that the 90° scan beam of FIG. 3 was designed for optimum coverage for a 12-foot truck at a distance of 5 feet. A car at a distance of 5 feet is fully scanned, but more than 50% of the beam has been wasted, scanning air.

Mechanical methods have been suggested to change the scan parameters between successive inspections so as to zoom the full x-ray beam on to the target L, and are described in Grodzins '339. But mechanical means cannot change beam parameters during the course of the inspection itself. Insofar as no means currently exists to change beam parameters during the course of inspection, techniques for doing so, described and claimed herein, constitute a timely invention.

Means for changing the shape of an x-ray beam by electronically varying the shape of an e-beam as it impinges upon a Bremsstrahlung target have long been known, and have been described in such references as U.S. Pat. No. 5,822,395 (to Schardt et al., 1997) where the cross-section of an electron beam is shaped to minimize apparent focal spot distortions for off-center angles, selectable target angles and beam power levels. Various electromagnetic scanning systems have also been taught where the propagation direction of an emergent x-ray beam may be varied electromagnetically. One example is U.S. Pat. No. 6,282,260 (to Grodzins).

Electromagnetic steering of an electron beam in the course of generating an x-ray beam comprises an aspect of the present invention, as discussed below. The prior art has described the discontinuous switching of electron beams among multiple anodes of a multi-anode x-ray tube, an aspect that does not accomplish the objectives of the present invention discussed below.

It had always been indicated, in all known references to the field of x-ray imaging, that obtaining multiple x-ray images of a target during the course of a single scan would require either multiple x-ray sources, splitting an electron beam to a sequence of radiation-producing targets, as suggested in US Published Patent Application US 2011/0206179 (Bendahan), or else employing a fast beam kicker, again to shift an electron beam to multiple individual targets at a high rate, as taught in US Published Application 2013/0136230 (Arodzero).

However, prior to the present invention, no one has ever been able to devise a way to obtain more than a single image of x-ray interactions with a single target during the course of a single pass of the inspection system relative to the inspected object using a solitary source with a solitary Bremsstrahlung target.

SUMMARY OF EMBODIMENTS OF THE INVENTION

In accordance with embodiments of the present invention, an x-ray source is provided that has a cathode for emitting a beam of electrons, a controller for varying a direction of the beam of electrons relative to an anode, and a snout, opaque to transmission of x-rays therethrough, characterized by a first aperture disposed at one apex of the snout and characterized by a variable snout length. Additionally, the x-ray source has a sweep controller for applying a signal to the beam controller in such a manner as to scan the beam of electrons in a prescribed path on the anode, thereby causing an x-ray beam to be emitted from the aperture in a direction that varies as a function of time.

In accordance with other embodiments of the invention, the aperture may be a Rommel aperture, as that term is defined below, and the Rommel aperture may be a variable Rommel aperture. The aperture may be adapted for repositioning relative to the anode. The beam controller may also have a steering coil. Moreover, the x-ray source may additionally have a snout length controller.

In an alternate embodiment of the invention, the x-ray source may have a second aperture for emission of an x-ray beam, adapted such that x-rays may be emitted from the first aperture or the second aperture on the basis of placement of the electron beam on the anode. A filter may be disposed in a channel disposed between the anode and the second aperture.

In accordance with another aspect of the present invention, a method is provided for sweeping an x-ray beam across an object of inspection, the method comprising:
varying a direction of a beam of electrons relative to an anode upon which the beam of electrons impinges;
coupling x-rays generated at the anode via an aperture disposed at an apex of a snout characterized by a snout length, thereby generating an x-ray beam characterized by a direction scanned as a function of time; and
adjusting the snout length on a basis of a dimension of the object of inspection.

In other embodiments of the invention, the method may have an additional step of differentially filtering x-rays emitted through two apertures in the snout, and an additional step of scanning a first portion of the object of inspection and subsequently scanning a second portion of the object of inspection. In the latter case, the second portion of the object of inspection may overlap the first portion, at least in part.

Scanning the second portion of the object of inspection may include scanning at a second sampling rate distinct from a first sampling rate at which the first portion was scanned, and the second scanning rate may be based, at least in part, on measurements derived during the course of a scan.

In accordance with yet another aspect of the present invention, an x-ray source is provided that has a cathode for emitting a beam of electrons and a controller for varying a direction of the beam of electrons relative to a first anode and a second anode. The x-ray source has both a first snout, opaque to transmission of x-rays therethrough, characterized by a first aperture disposed at one apex of the first snout, and a second snout, opaque to transmission of x-rays therethrough, characterized by a second aperture disposed at one apex of the second snout. A sweep controller is provided for applying a signal to the beam controller in such a manner as to scan the beam of electrons in a prescribed path on the first and second anodes, thereby causing a first x-ray beam to be emitted from the first aperture in a direction that varies as a first function of time and a second x-ray beam to be emitted from the second aperture in a direction that varies as a second function of time.

In this case, as well, the first aperture may be a Rommel aperture, and, more particularly, a variable Rommel aperture. Similarly, the second aperture may be a Rommel aperture, variable, or not. The first aperture and the second aperture may have distinct aperture openings. The x-ray source may also have a snout length controller for controlling a length of the first snout.

In accordance with another aspect of the present invention, a system is provided for simultaneously inspecting a plurality of vehicles. The system has a portal comprising a plurality of openings, each opening accommodating a vehicle of the plurality of vehicles The system has at least one electromagnetic scanner disposed in a vertical member between two of the plurality of openings for generating a first x-ray beam directed to a first of the plurality of openings and a second x-ray beam directed to a second of the plurality of openings. Then, the system has a first detector for detecting x-rays scattered from the first x-ray beam by a first of the plurality of vehicles and for generating a first scatter signal, and a second detector for detecting x-rays scattered from the second x-ray beam by a second of the plurality of vehicles and for generating a second scatter signal. Finally, the system has a display for displaying images of the first and the second scatter signals.

In accordance with yet a further aspect of the invention, a mobile system is provided for simultaneously inspecting a vehicle and cargo. The mobile system has a bilateral scanning system disposed within a conveyance for sweeping a first x-ray beam in a scan path outside the conveyance and a second x-ray beam in a second scan path in a plane within the conveyance. The mobile system also has a conveyor for moving the cargo through the plane of the second scan path, a first detector for detecting x-rays scattered by the vehicle from the first x-ray beam, and a second detector for detecting x-rays interacting with the cargo.

BRIEF DESCRIPTION OF THE DRAWINGS

The foregoing features of the invention will be more readily understood by reference to the following detailed description, taken with reference to the accompanying drawings, in which:

FIG. 2 depicts a prior art scanning x-ray beam former.

FIG. 3 shows less-than-optimal matching of a beam-scanning system to a vehicle under inspection by a prior art x-ray scanning system.

FIGS. 4A-4C show beam coverage plots of successive beam sweeps using the prior art scanning x-ray beam former at three successive relative speeds between the inspection vehicle and a scanned target.

FIG. 8A is a schematic illustration of the use of a snout for production of multiple images taken from distinct x-ray pointing angles, in accordance with an embodiment of the present invention. FIG. 8B is a detailed schematic of such a multi-imaging snout in cross section.

FIG. 9 is a cross-sectional view of an electromagnetic scanner for generating X-ray beams emitted in multiple directions in accordance with an embodiment of the present invention.

FIGS. 14A-14C depict a sample of relative placements of a Rommel aperture relative to a scanned anode and corresponding scan angles of emergent x-rays in accordance with a class of embodiments of the present invention.

DETAILED DESCRIPTION OF EMBODIMENTS OF THE INVENTION

Definitions: As used herein, and in any appended claims, the following terms shall have the indicated meanings unless the context requires otherwise. The term "vehicle" shall denote any conveyance for transporting people or equipment, whether self-propelled, or otherwise. When the vehicle is an object of x-ray inspection, it may also be referred to herein, without limitation, as a "car."

The term "beam angle" refers to an instantaneous exit angle of a beam from a scanning device measured in relation to a center line of the angular beam span. (The beam angle, thus, varies from instant to instant as the beam is scanned.)

"Scan angle" is defined as a the extremal angle measured between an x-ray pencil beam emerging from an x-ray scanner relative to a fiducial direction, such as the central axis of an electron beam emitted by a source and directed towards an anode.

For purpose of describing or claiming the present invention, the term "sweep angle" is defined to be identical to, and synonymous with, the term "scan angle."

The term "pointing angle" of a swept beam is defined as the central direction of the sweep.

A "pointing direction" is defined as the direction of propagation of an x-ray pencil beam emerging from an x-ray scanner, where the direction is defined in space, rather than relative to any fiducial object or axis.

The term "snout" shall be defined to mean an enclosure that opaque to the radiation in question but for one or more defined openings through which radiation is allowed to emerge.

The term "snout length" is defined as the distance between an anode where x-rays are generated and an aperture in a snout where x-rays emerge from the snout for scanning exterior target objects. It is also known as "collimation length."

As used herein and in any appended claims, the term "Rommel collimator" shall refer to an x-ray aperture that allows for forming a scanning x-ray beam of desired size and flux independently of the beam angle as described in US 2014/0010351 (Rommel, now issued as U.S. Pat. No. 9,117, 564), or any functional variant thereof. The term "Rommel aperture" shall have a meaning synonymous with that of "Rommel collimator."

A "variable Rommel aperture" is a Rommel aperture, parameters of which may be modified by a user during the course of operation.

The term "true zoom" refers to the capability of varying the field of view of a scanning system while maintaining a constant image size as measured in pixels.

The term "scan height" is defined as the limiting vertical extent of a scanned beam, measured at the position, relative to the scanner, of an inspected item.

The term "real-time" means during the course of inspecting a single inspection target in a single pass of that inspection target relative to an x-ray inspection apparatus.

Figure 5A:
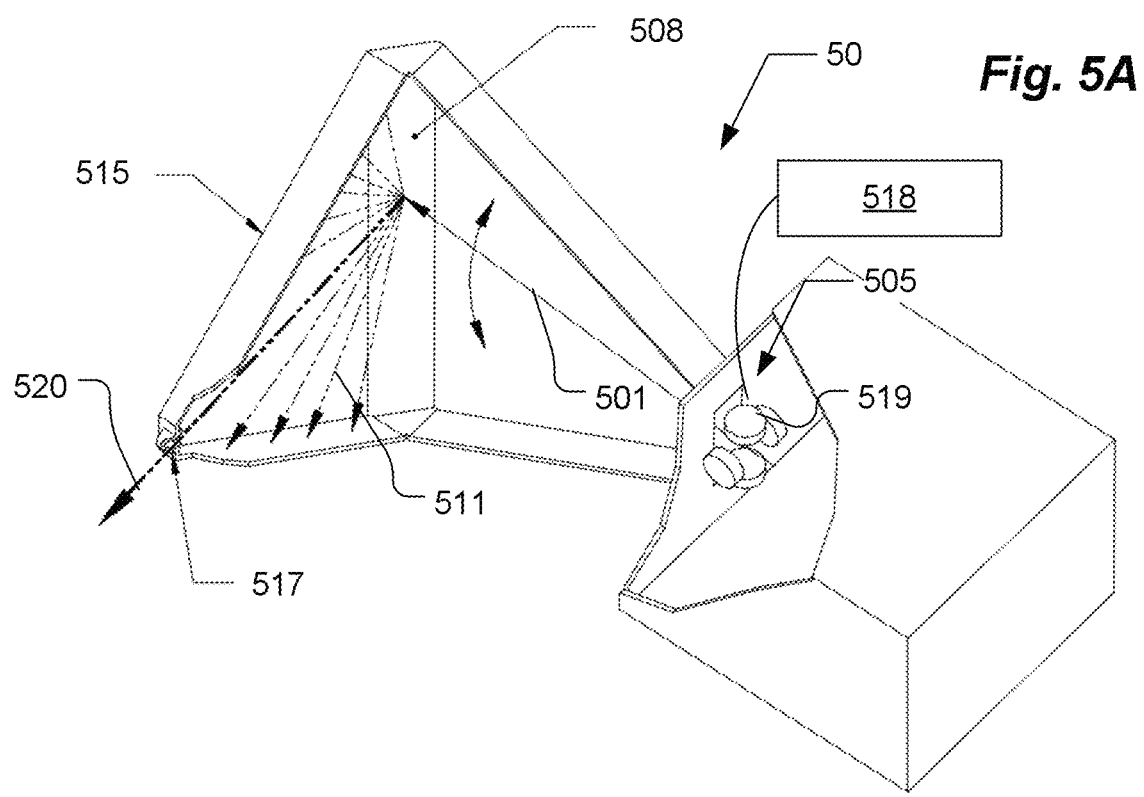
FIGS. 5A and 5B illustrate the principle of electromagnetic scanning of an x-ray beam in accordance with embodiments of the present invention.

Embodiments in accordance with the present invention are now described with reference to an electromagnetic scanner (EMS) 50 depicted in FIGS. 5A and 5B. EMS 50 may replace the beam former 20 of FIG. 2, or any other beam former, when it is used in the x-ray inspection application described above with reference to FIG. 1, for example. Electrons in an electron beam 501 from a source, such as an x-ray tube 203 (shown in FIG. 2), are focused and steered by beam controller 505 so as to sweep over an anode 508, which may optionally be water-cooled. Beam controller 505 applies electric and/or magnetic fields for confining and steering electron beam 501, and, in particular, beam controller 505 includes beam steering coil 519. The source of electrons typically includes a cathode 207 from which electrons in electron beam 501 are emitted. Impingement of electron beam 501 onto anode 508 produces x-rays 511 that, in the transmission geometry depicted in FIG. 5B, pass through the anode 508, and out of a vacuum space 513, into a snout 515 that has a single-exit aperture 517 (otherwise referred to herein as aperture 517) at its apex 519. Aperture 517 is preferably a Rommel aperture, as defined above, and, for convenience, aperture 517 may be referred to, herein, as a "Rommel aperture," without loss of generality. Emerging x-ray beam 520 is swept in angle as electron beam 501 is swept across anode 508. A sweep controller 518 drives beam controller 505 by applying a signal to sweep electron beam 501 across anode 508 in a prescribed path as a function of time.

Figure 5B:
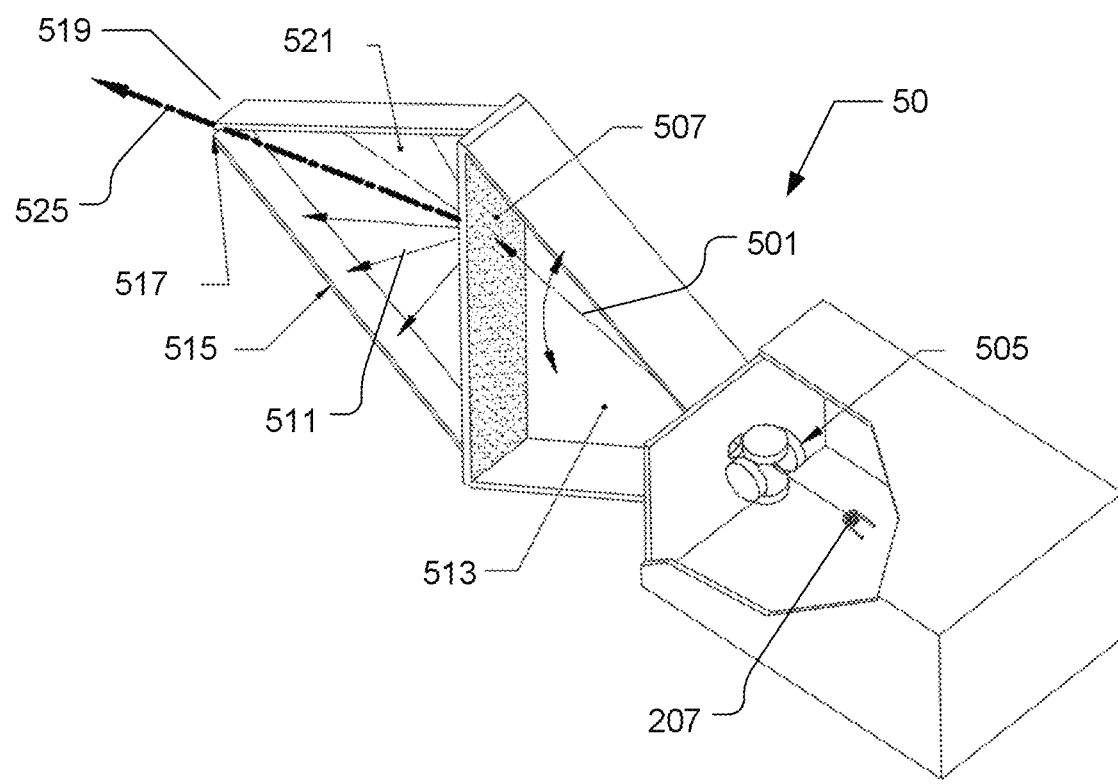

FIG. 5B shows a "transmission" geometry of the EMS with the x-ray beam passing through the anode 507, which also serves as a vacuum barrier. Beyond anode 507, snout 515 may be filled with air 521 or another substance.

For heuristic clarity, further description may refer to the transmission geometry of FIG. 5B for purposes of illustrating terms and applications. However, it is to be noted that another embodiment employs a "reflective" geometry, as depicted in FIG. 5A, in which reflection anode 508 is disposed at an angle, typically 20°, relative to electron beam 501. The reflective configuration depicted in FIG. 5A is often preferred, especially when space is a premium. In the reflective geometry of FIG. 5A, x-rays 511, emitted from the front face of the reflection anode 508, pass out of the vacuum space 513 into an aperture-tipped snout 515 pointing at an angle, typically 90°, to the electron beam 501. Scanned x-ray beam 520 is emitted via aperture 517, which, as in the transmission case, is preferably a Rommel aperture.

Figure 1:
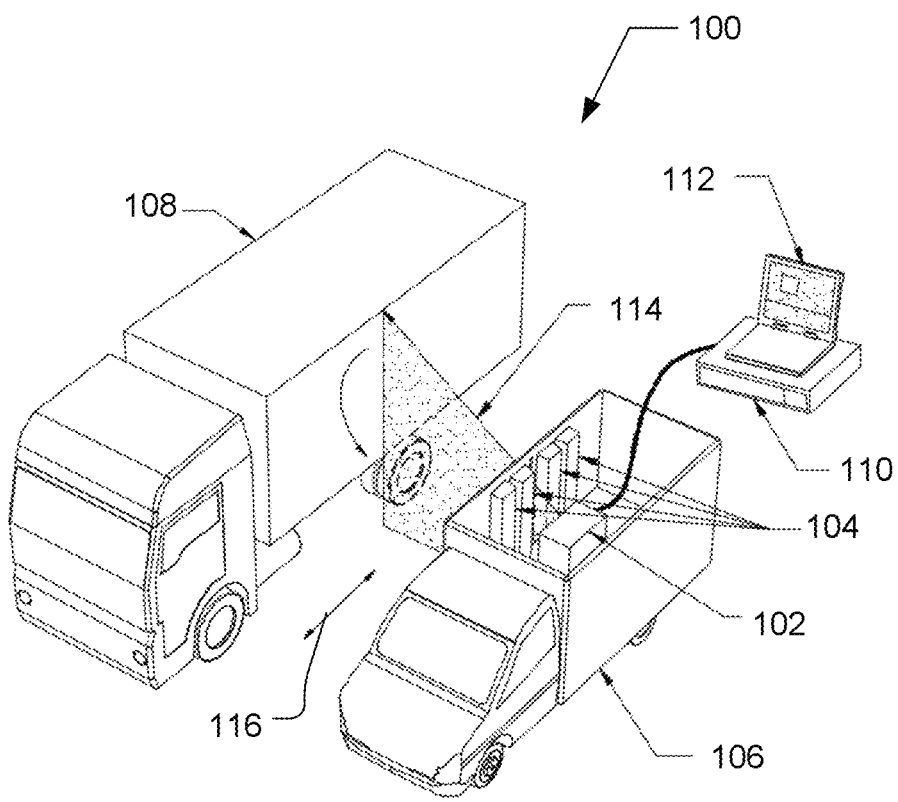
FIG. 1 depicts a prior art x-ray backscatter system in which an x-ray source and a set of detectors are enclosed within an inspection vehicle.

As electron beam 501 scans down (up) reflection anode 508, x-ray beam 520 exiting aperture, scans up (down) an inspected target 108 (shown in FIG. 1). Novel capabilities enabled by the present invention are exemplified by a reflection anode 508 assumed to be 50 cm long by 2 cm wide, a relatively small anode area for EM scanning, but one that is still one thousand times the active area of the anode of the prior art x-ray tube of FIG. 2. The electron beam 501 can address the entire 50 cm×2 cm reflection anode 508, producing x-ray beams over a maximum angular range, in this case, of 90°×3.4°.

For purposes of example, the following practical parameters are provided: A focal spot of 0.5 mm, and a snout length of 25 cm ending in a variable Rommel aperture, set at a 1 mm×1 mm opening. The x-ray beam from the aperture produces a 5-mm pixel at 5 feet. It is to be noted that the pixel size, at a fixed horizontal distance, is independent of the vertical height of a pixel over the range of heights at which the x-ray beam is emitted as long as the anode is parallel to the object plane being imaged. The constant widths of the pixel stripes, shown in FIG. 4, are a correct representation for the EMS; the uniformity of pixel size with vertical height is advantageously achieved with electromagnetic scanning, whereas achieving such uniformity with other means of x-ray beam control would be cumbersome.

In accordance with embodiments of the present invention, the electrons in electron beam 501 sweeping along anode 507 need not be continuous but can be controlled in microsecond steps, with reduced or even zero electron current during transit from one pixel to the next. For simplicity, a constant electron sweep speed of 250 m/s along anode 507 may be assumed, with fly-back speeds at least an order of magnitude faster. In the discussion below, the fly-back times are ignored; in practice they can be accounted for by small increases in the pixel size.

It may be emphasized that parameters are described herein without limitation and for illustration purposes only. In practice, the specifics of the EMS parameters, including their adjustable ranges, depend on the system design. The essential point is that changes, within the phase space of the parameters controlled by the electromagnetic (EM) fields, may be made in microseconds. It is to be noted, further, that all of the innovations described in accordance with the present invention may be applied in either the transmission mode shown in FIG. 5B or the reflection mode shown in FIG. 5A.

The assumed scanning speed of the electron beam 501 of 250 m/s (900 kph) scans the 50 cm anode in 2 ms, which approximates the scanning speed of a very fast mechanical chopper wheel. The EMS 50, however, is capable of scanning the electron beam at speeds exceeding 10,000 kph, so that the electron beam 501 can be positioned anywhere within the area of anode 507 in a fraction of a single sweep time. Moreover, since the intensity of the electron beam 501 can also be controlled in microseconds, the fly-back times of the electron beam can be carried out with the beam off.

Figure 6A:
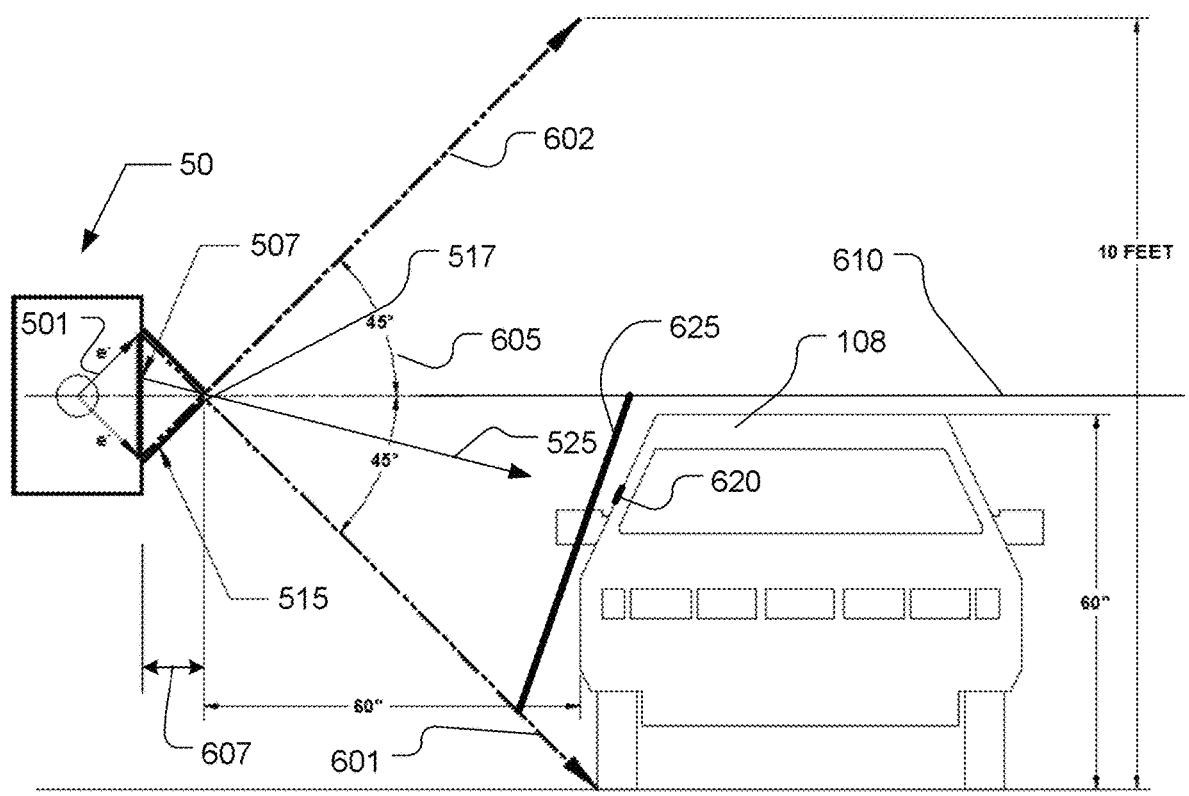
FIG. 6A depicts the scanning of a vehicle with an electromagnetically scanned x-ray beam in accordance with an embodiment of the present invention.

FIG. 6A shows a vehicle 108 undergoing inspection by an electromagnetic scanner 50 in accordance with an embodiment of the present invention. Electron beam 501 is scanned across anode 507, thereby generating x-rays 525 that may be directed, via aperture 517 in snout 515, in directions between scan limits 601 and 602, and, in particular, may be limited to the angular extent of the vehicle 108. Thus, in the scanning operation depicted in FIG. 6, scanning is optimally limited between the horizontal axis 610 and the lower scan limit 601.

The limiting angle of the emergent x-ray pencil beam 525 relative to a central fiducial axis 603 is the scan angle 605. Scan angle 605 is determined by the anode/snout geometry. Changing the length 607 of the snout 515, together with changes in the size of aperture 517, both of which can be done in seconds—as between successive inspections, advantageously allows the EMS 50 to have optimum zoom and pixel size over a wide range of vehicle heights, speeds and distances.

The length 607 of the snout 515 is defined as the distance between the anode 507 and Rommel aperture 517. Changing the length 607 of the snout 515 in the seconds prior to the target vehicle 108 crossing the scanning x-ray beam 525 advantageously allows the entire beam flux to concentrate on targets of different heights and distances.

Figure 7A:
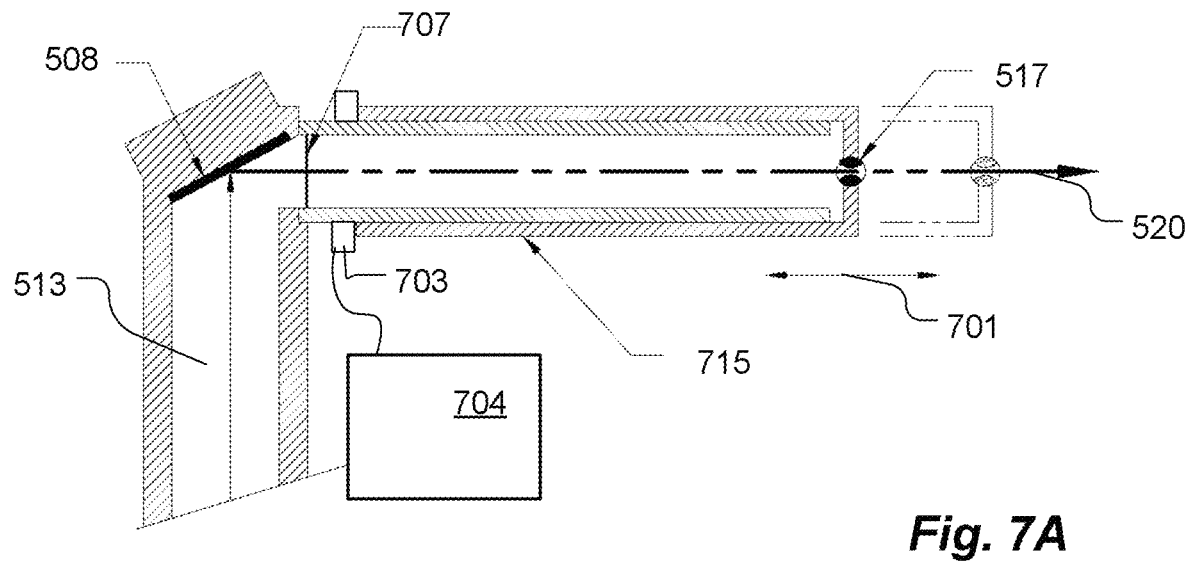
FIG. 7A is a cross-sectional view of an electromagnetic scanner with a snout of variable length in accordance with an embodiment of the present invention.

An embodiment of the present invention providing for varying the length 607 of an adjustable snout 715 is now described with reference to FIG. 7A. The displacement of Rommel aperture 517 with respect to reflection anode 508 is varied in along direction 701 by an actuator 703, which may, within the scope of the present invention, be a motor-driven mechanical linear actuator, or any other kind of actuator. A vacuum barrier 707 seals vacuum space 513. Processor 704 serves to drive actuator 703, and the combination of processor 704 and actuator 703 may be referred to herein as a snout length controller.

Operation of variable-length snout 715 may be appreciated from the following example. A 15-foot-heigh tractor-trailer that is 5 feet from the EMS is most effectively scanned with a 15-cm snout length that produces a scan angle of 117°. But if the tractor-trailer were 10 feet from the EMS, the scan height (as defined above) would be 32 feet and 50% of the beam would be wasted. The EMS snout of FIG. 7A gives the operator (or the pre-programmed computer) different options for utilizing the beam more effectively, including increasing the snout length to 35 cm and opening up the Rommel aperture 517 or scanning over a shorter length of the anode.

Limiting the scan to a specified range is an illustration of the true-zoom capability of the EMS of the present invention. Referring to FIG. 6A, it is first assumed that car 108 travels 5 feet from the EMS at a speed of 5 kph. For this illustration, the Rommel aperture 517 at the end of the 25 cm snout 515 is adjusted to be 0.6 mm wide so as to produce a 3 mm wide pixel 620 at the car 108.

During each 2 msec, car 108 has moved 2.8 mm. The x-ray sweeps 625, which are 3 mm wide, overlap, such that the car 108 is fully scanned. The scan height (i.e., the vertical extent of the scan, when the full height of anode 507 is scanned), however, is twice the height of the car, so 50% of the beam is again wasted on scanning air, as was the case with the prior art mechanical scanner 20, described above with reference to FIG. 3. The mismatch, which can be determined prior to the scan, with the use of the speed and distance sensors, can, alternatively, also be determined in a few milliseconds from the results of the first few scans of the target vehicle 108. With that knowledge, the EMS 50 confines the electron sweep to the upper half of the anode 507. Now a sweep of the car takes only one millisecond (rather than 2 ms), during which time the car has moved only 1.4 mm, less than half the 3-mm width of the x-ray beam 525 on the vehicle. Successive sweeps of the x-ray beam 525 overlap by more than a factor of two, increasing the flux on the car by a factor of two and increasing the signal to noise in each pixel by about 40%.

True-zoomed and twice-over-scanned conditions can be readily created over broad ranges of vehicle heights extending to at least 15 feet, vehicle distances from at least 4 to 15 feet, and relative speeds at least as fast as 12 kph.

It is to be appreciated, in particular, that the images made from successive sweeps are independent. Thus, for example, each alternate sweep may be made independent, such that an image created from odd numbered sweeps may be independent of the image created by the even numbered sweeps. Each series of interleaved sweeps may have its own angular spread (i.e. zoom), pointing angle and pixel resolution.

As now discussed with reference to FIGS. 7B-7D, snouts 720 with more than one channel A and B allow these parameters to be changed in microseconds, that is, in real time during the inspection, to create at least two independent images. The following examples use an exemplary EMS 50 with a reflection anode 508 that is 50 cm long by 2 cm wide. In each example, the knowledge of the speed, height and distance of the target vehicle 108 is assumed to be predetermined by sensors, such as radar, sonar, and optical cameras, for example, typically a few seconds prior to the target vehicle passing through the scanning x-ray beam 520. During those few seconds, the mechanically controlled beam parameters, such as the snout length 607 (in FIG. 6A) and the size of the Rommel aperture 517, can be adjusted so that the pixel width 620 on the target vehicle 108 is at least twice the distance the vehicle moves during a single beam sweep.

Insofar as a snout 720 has multiple channels A and B, successive sweeps may be characterized by Primary sweep times $\Delta T(P)$ and Secondary sweep times $\Delta T(S)$. Detection (using detectors such as backscatter detectors 104 and standard x-ray detection techniques) of x-rays scattered by the target 108 during the course of a Primary sweep generates a signal that is processed (using standard backscatter signal processing techniques) to form a Primary Image. Similarly, the Secondary sweeps form as many Secondary Images, $\Delta T(S_i)$ as can be fit into the time interval, $\Delta T(P)$, of the Primary sweep. The Primary and Secondary scans are interleaved, with Secondary scans occurring interlinearly between Primary scans.

Example 1. Concentrating the Secondary View on a Specific Area

Figure 6B:
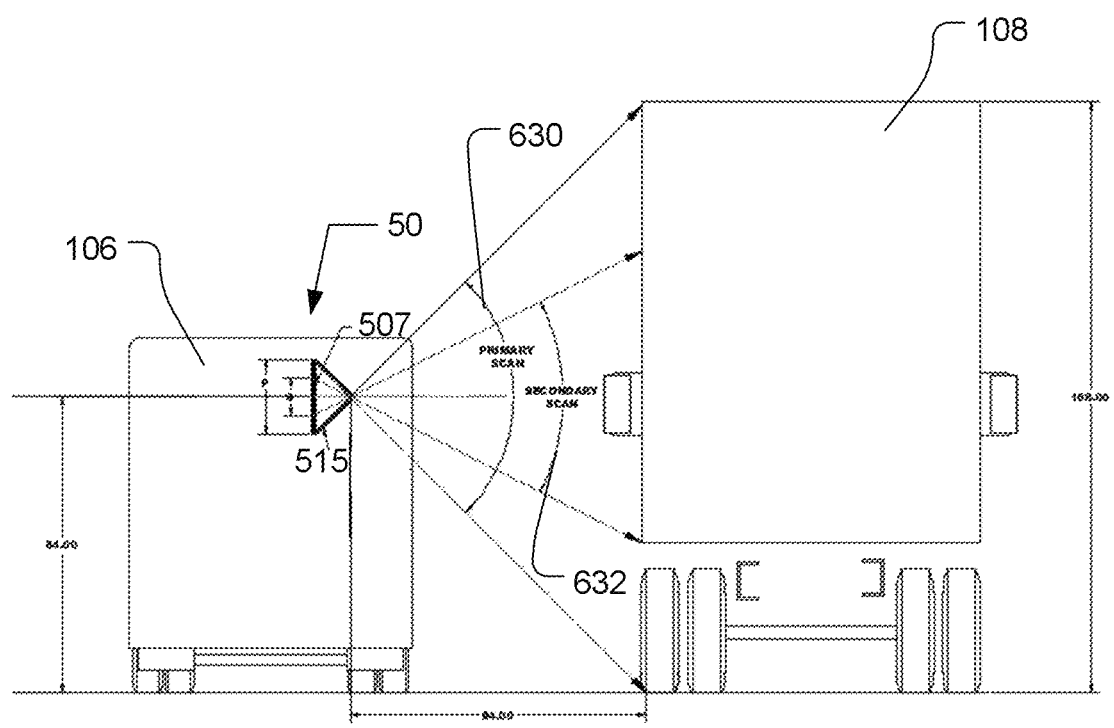
FIG. 6B depicts the scanning of a vehicle with an electromagnetically scanned x-ray beam having interleaved Primary and Secondary scans in accordance with an embodiment of the present invention.

Inspectors may want enhanced images of a specific portion of all trucks. FIG. 6B shows the EMS scanning a 14 foot high tractor-trailer traveling at 12 kph at 7 feet distance from the snout 515 of the EMS 50. During the scan of the tractor, the beam height and intensity are easily adjusted to fit the size and maximum radiation dose. During the scan of the trailer, the single drive-by produces two independent views: a primary image of the entire trailer and an improved secondary image of the cargo in the bottom half of the trailer's interior. In this example, the semi has moved 3.3 mm during the 2 millisecond full sweep of the 14 foot height. The Rommel aperture 517 (shown in FIG. 5A), set at 1 mm diameter, produces stripes of pixels that are 7 mm wide. The odd numbered sweeps, called the Primary Sweeps along a Primary scan path 630, abut. The Primary sweeps alone produce an image of a fully scanned trailer. Alternating sweeps are now divided into Primary sweeps and Secondary sweeps, the latter occurring over Secondary scan path 632.

Each Primary sweep takes 2 msec and scans the full 14 feet of the truck's height. The 2 msec following each Primary sweep is used for Secondary sweeps. In the depicted in FIG. 6B, the Secondary sweeps concentrate on the 4.5 feet above the floor of the trailer, where the greatest concentration of goods may be. Each 4.5 foot scan takes only 0.64 msec, so three Secondary sweeps follow each Primary sweep. The images formed by the Primary and Secondary scans can be viewed separately or overlaid in precise registration. The operator now views an image with significantly improved signal to noise in a likely place for contraband.

Example 2. Use of a Dual-Channel Snout to Improve Resolution

Figure 7B:
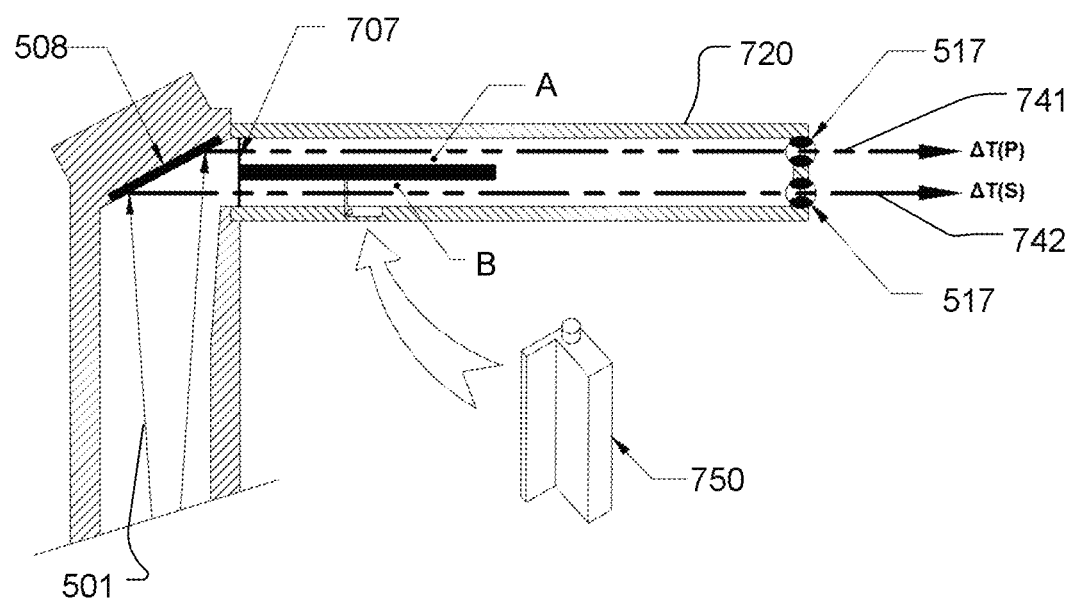
FIG. 7B is a cross-sectional view of a dual-energy electromagnetic scanner in accordance with an embodiment of the present invention.
Figure 7C:
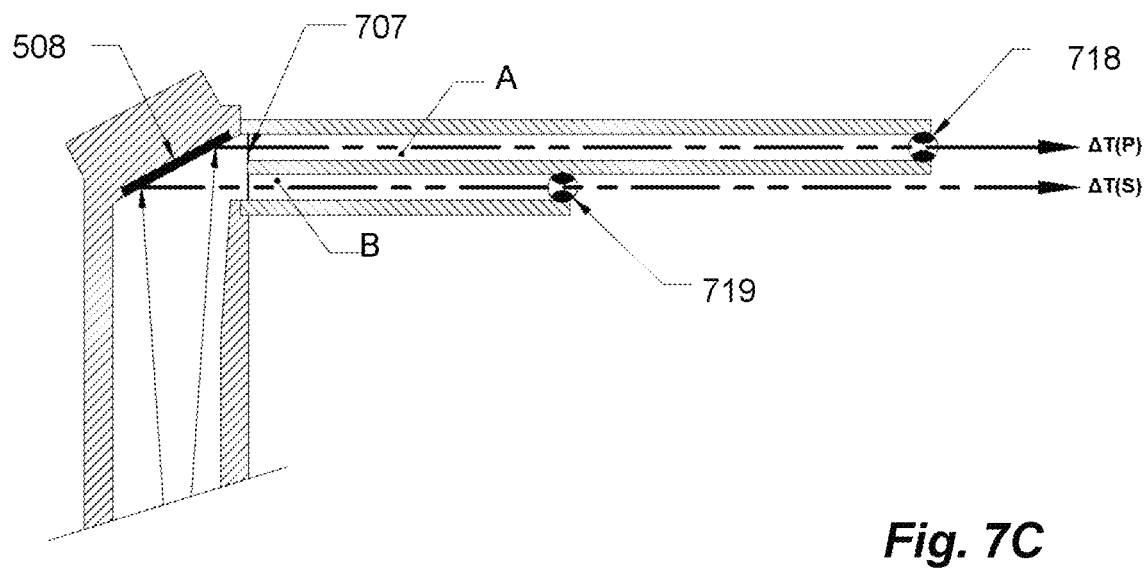
FIG. 7C is a cross-sectional view of an electromagnetic scanner with channels of different lengths in accordance with a further embodiment of the present invention.
Figure 7D:
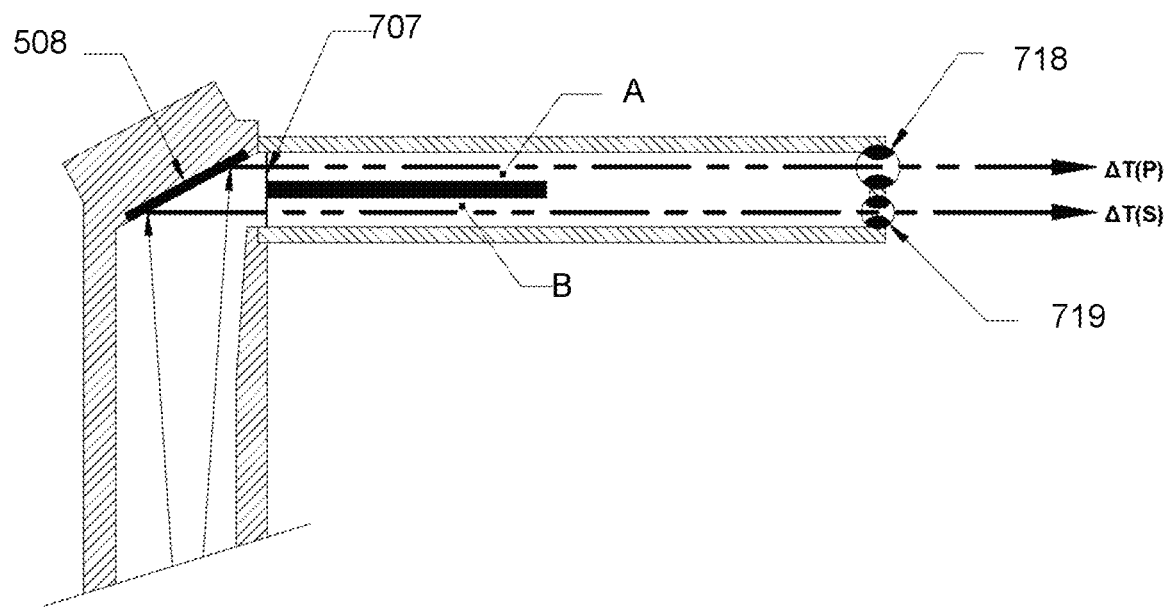
FIG. 7D is a cross-sectional view of an electromagnetic scanner with different size apertures in accordance with an embodiment of the present invention.

Snouts 720 of each of FIGS. 7B-7D have separate Rommel collimators 517 in each of two channels A and B, and can be used to obtain two independent views by alternating the scans of electron beam 501 such that that the odd-numbered x-ray beams 741 go through Channel A and the even numbered x-ray beams 742 go through Channel B, to produce different pixel energies, resolution or pixel intensity, as the case may be. Such a snout may be referred to as a "dual-channel snout," or, alternatively, as a "two-channel snout." Snouts with more than a single channel may be referred to as "multi-channel snouts."

Example 3. Eliminating False Alarms from External Plastic

The backscatter (BX) inspection of vehicles, in the search for explosives or drugs, encounters serious difficulty distinguishing potential contraband inside the car's steel body from light element materials, such as plastic and carbon fiber, that may compose part of the outside of the vehicle. An EMS 50 in accordance with one of the embodiments of the present invention, may advantageously eliminate the false alarms by sending the ΔT(P) beams through channel A of FIG. 7B, and the alternate beams ΔT(S) through the channel B of FIG. 7B, which has a filter 750. Filter 750 may strongly absorbs x-rays below about 70 keV, for example. Thus, a car 108 may be scanned twice, where each scan is complete and provides spectral resolution. Comparing the intensity of the pixels in the image composed of x-rays through channel A, with the corresponding intensities in the image composed of x-rays through B, uniquely identifies whether a light element material is or is not behind steel.

A physical explanation of the phenomenology involved is as follows: Finding plastic or other low-Z objects behind the steel of vehicle bodies requires x-rays energetic enough that they first penetrate the steel, then Compton backscatter in the plastic target, and finally pass back out through the steel to reach the detector 104 (shown in FIG. 1).

Considering the 60 keV component of the x-ray spectrum from the EMS 50, the intensity of that spectral component is diminished by almost a factor of four on entering the interior by passing through 1.5 mm of steel. The beam is now Compton backscattered by the plastic, a process that reduces the 60 keV to 49 keV. The 49 keV x-rays get absorbed, on retraversal of the skin of the vehicle, by an additional factor of 10. The net loss, just due to absorption in the 1.5 mm steel wall of the vehicle, is a factor of 40. The loss, for a 60 keV x-ray, is 10 times the intensity loss for a 90 keV incident x-ray. Thus, low-energy x-rays, which would give strong signals from unshielded plastic, are impractical for detecting plastic shielded by even modest thicknesses of steel.

Eliminating the lower energy flux from the beam makes a small difference to the two images if the plastic is behind steel, but makes a large difference if the plastic is unshielded. Some tests values using a 220 keV x-ray beam on a 2" thick target of high density polyethylene, behind and in front of 1.5 mm of steel makes the point. Table 1 shows the results for inserting 1.5 mm Cu filter into the beam.

TABLE 1

|  | HDPE in front | HDPE behind |
| --- | --- | --- |
| No Filter | 13.9 | 4.4 |
| 1.5 mm Cu | 5.08 | 2.4 |
| R (No Filter):Filter | 2.7 | 1.8 |

The 50% difference between the ratio values of 2.7 and 1.8 can be distinguished automatically allowing the computer to unambiguously inform the location of light-element objects (as to whether they are in front of, or behind, the steel skin of a vehicle. The thickness of filter 750 in FIG. 7B, which extends over the full scan angle, preferably varies inversely with the cosine of the angle that the exiting x-ray makes with respect to the central ray.

Example 4. Satisfying Criteria on a Sweep-by-Sweep Basis

The parameters of the EMS 50 can be preprogrammed to oversample all regions that satisfy specific criteria. This may result in multiple changes of the Secondary scans during a single inspection. For example, the scanning criterion may be to oversample all areas that produce, in the Primary scans, backscatter intensities that indicate the presence of a low-Z target, or to oversample when a sudden drop in intensities of the Primary scan indicates the possible presence of a metal container. The criterion might be the intensity pattern of a single Primary sweep, or the intensity patterns from successive sweeps. The foregoing criteria are presented by way of example only, and without limiting the scope of the present invention.

Example 5. Changing the Pixel Resolution between P and S Scans

In accordance with other embodiments of the present invention, the pixel size 620 (shown in FIG. 6A) on the target 108 can be changed by changing the distance 607 from the anode 507 to the aperture 517 or by changing the aperture size. Mechanical beam formers can do that in seconds but not in the microseconds required to make the changes during an inspection. The EMS 50 can do so during the inspection by, for example, using a two-channel snout, such as shown in FIG. 7D, with a first Rommel collimator 718 set to one width, and a second Rommel collimator 719 set to a different width. Alternatively, or additionally, the distances between anode 708 and respective Rommel collimators 718 and 719 may differ between channels, as shown in FIG. 7C.

Example 6. Multiple BX Viewing Angles

The fundamental notion of measuring depth from backscatter views taken from different angles is described in U.S. Pat. No. 6,081,580 (to Grodzins et al.), incorporated herein by reference. Assuming that the Primary view is the central beam, which is perpendicular to the direction 116 (shown in FIG. 1) of relative motion, two Secondary views can be obtained by scanning the electron beam along either edge of the 2 cm wide anode. The angular differences of plus and minus 1.7° to the perpendicular for a 25 cm snout are not sufficient for most applications but, wider anodes are practical. Within the scope of the present invention, inspections taken at an appropriate slow speed can, with the wide anode and proper snout, produce a sequence of angular images of the target that would inform the depth of objects in the images. Multiple apertures may be also used in a single snout 805, as shown in FIGS. 8A and 8B, to produce multiple images, each taken from a different x-ray pointing angle, to give information on the depth of objects in the target vehicle 108. Furthermore, an integrated system 800 may advantageously combine backscatter data, derived from backscatter detectors 104 with transmission (TX) data, obtained with transmission detectors 802, which may be unsegmented, and that measure the intensities of the transmitted beams. Each of the images of transmitted x-rays is in time sync with the appropriate backscatter image.

In accordance with other embodiments of the present invention, a bilateral scanning system, designated generally by numeral 900, is now described with reference to FIG. 9. An electron beam 501 is steered, during the course of a single scan, to impinge alternatingly upon a plurality of anodes 508. X-ray 901 emitted at anodes 508 traverse vacuum barriers 707 and are transmitted through vacuum region 907, forming respective right- and left-directed beams 903 and 905 after passing through Rommel apertures 517 at respective ends of snouts 910 and 912. Right- and left-directed beams 903 and 905 may thus be scanned independently of each other. Snouts 910 and 912 may be adjustable in length, as discussed above with reference to FIG. 7A. Adjustability in length of snouts 910 and 912 provides for "true zoom" (as defined above) for one or both of right- and left-directed beams 903 and 905.

Figure 10:
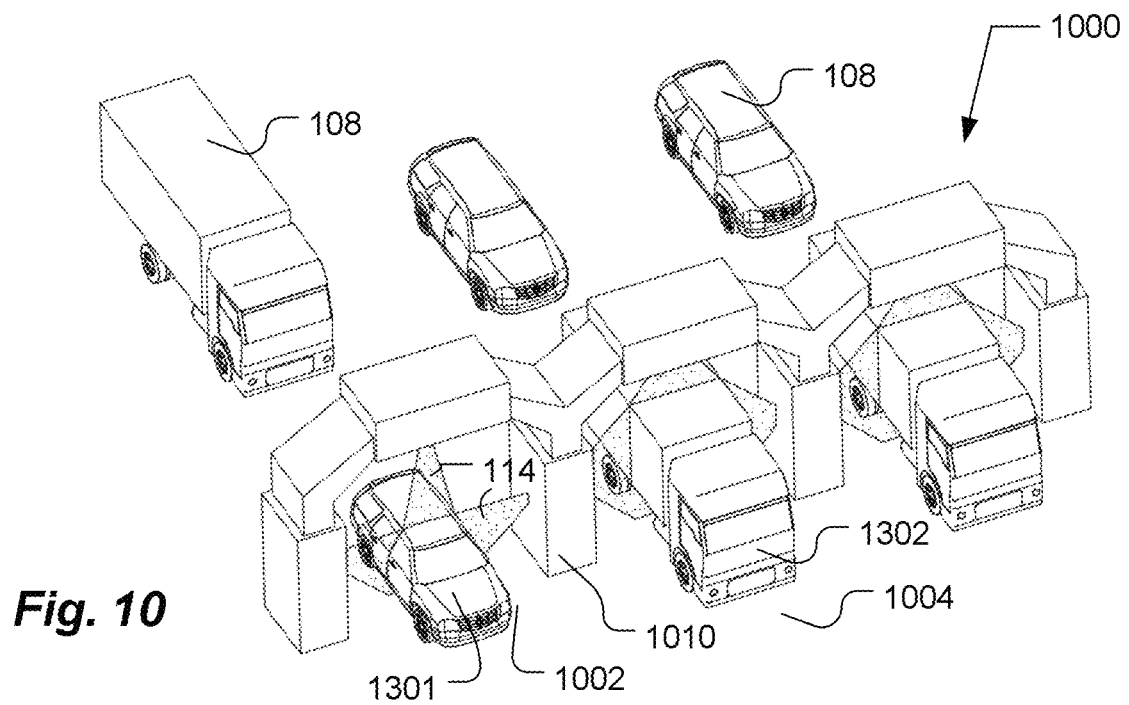
FIG. 10 shows a multi-lane x-ray inspection portal system, in accordance with an embodiment of the present invention.
Figure 11:
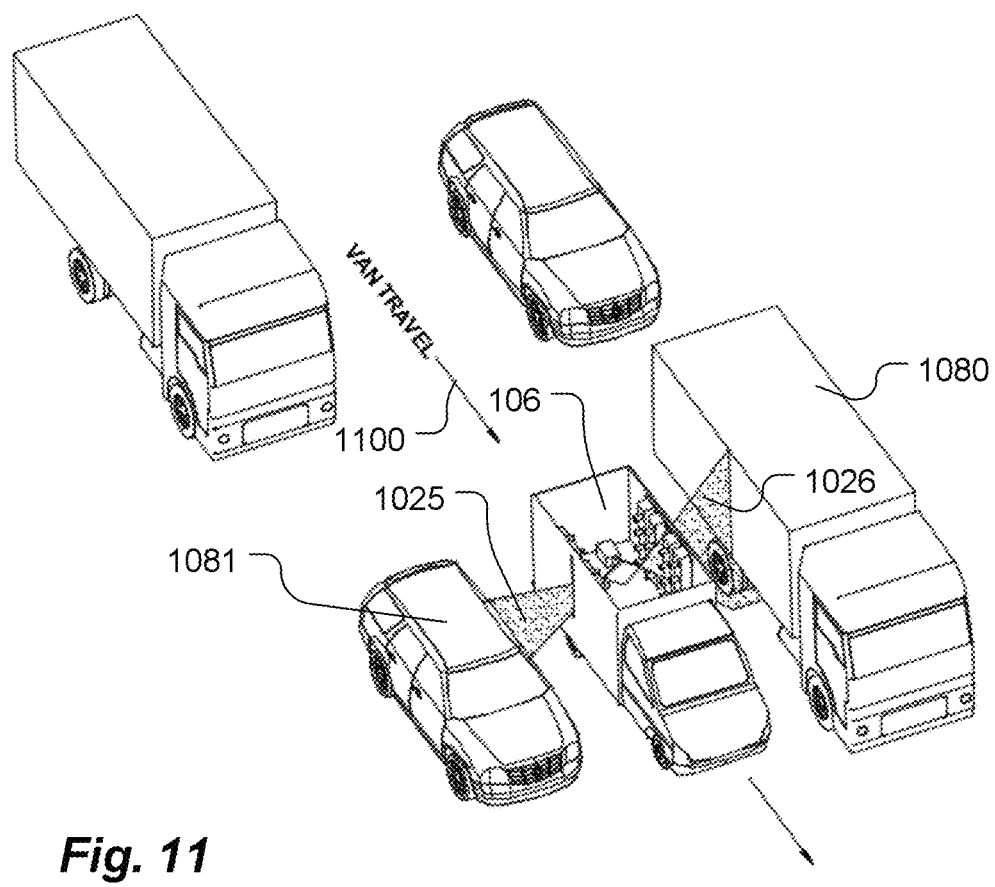
FIG. 11 shows a bilateral x-ray inspection van, in accordance with a further embodiment of the present invention.

Formation of two scanning beams 903 and 905, as described with reference to FIG. 9, advantageously enables a number of applications. In the embodiment now described with reference to FIG. 10, a portal structure designated generally by numeral 1000 may be employed for parallel inspection scan a plurality of vehicles 108 passing through the portal 1000 on a plurality of roadbeds 1002 and 1004. X-ray beams may be incident on each vehicle 106 in a plurality of scanning patterns 114, typically from the top and from both of two sides. Whereas implementation of an inspection portal with left- and right-directed x-ray beams typically requires two x-ray sources (one on each side), the right- and left-directed beams 903 and 905 of FIG. 9 require only a single bilateral scanning system 900 for their generation. Such a bilateral scanning system 900 is disposed within an inspection column 1010 between roadbeds 1002 and 1004 such that only N+1 scanning systems are required to cover right- and left sides of N vehicles 106. It is to be understood that portal structure 1000 may be fixed, as shown, or also encompass gantry operation, where portal structure 1000 moves, on rails or otherwise, to scan stationary targets, such as cargo containers, in parallel. Inspection column 1010 also contains a first scatter detector (not shown) for detecting x-ray radiation scattered by a first inspected vehicle 1301 simultaneously with detection, by a second scatter detector (not shown), also contained with inspection column 1010, of x-rays scattered by a second inspected vehicle 1302. The detectors produce respective backscatter signals that are processed to produce backscatter images displayed to an operator on a display 1250.

In an analogous fashion to the operation of a fixed portal bilateral scanning system as described with reference to FIG. 9, a bilateral scanning system 900 may also be mounted on an inspection vehicle 106 and scan two inspection targets 1081 and 1082, one on either side of inspection vehicle 106. Inspection vehicle 106 may emit scanning patterns 1025 and 1026 of x-rays to both sides, and thus scan vehicles on either side as it travels in direction 1110.

Figures 12A, 12B:
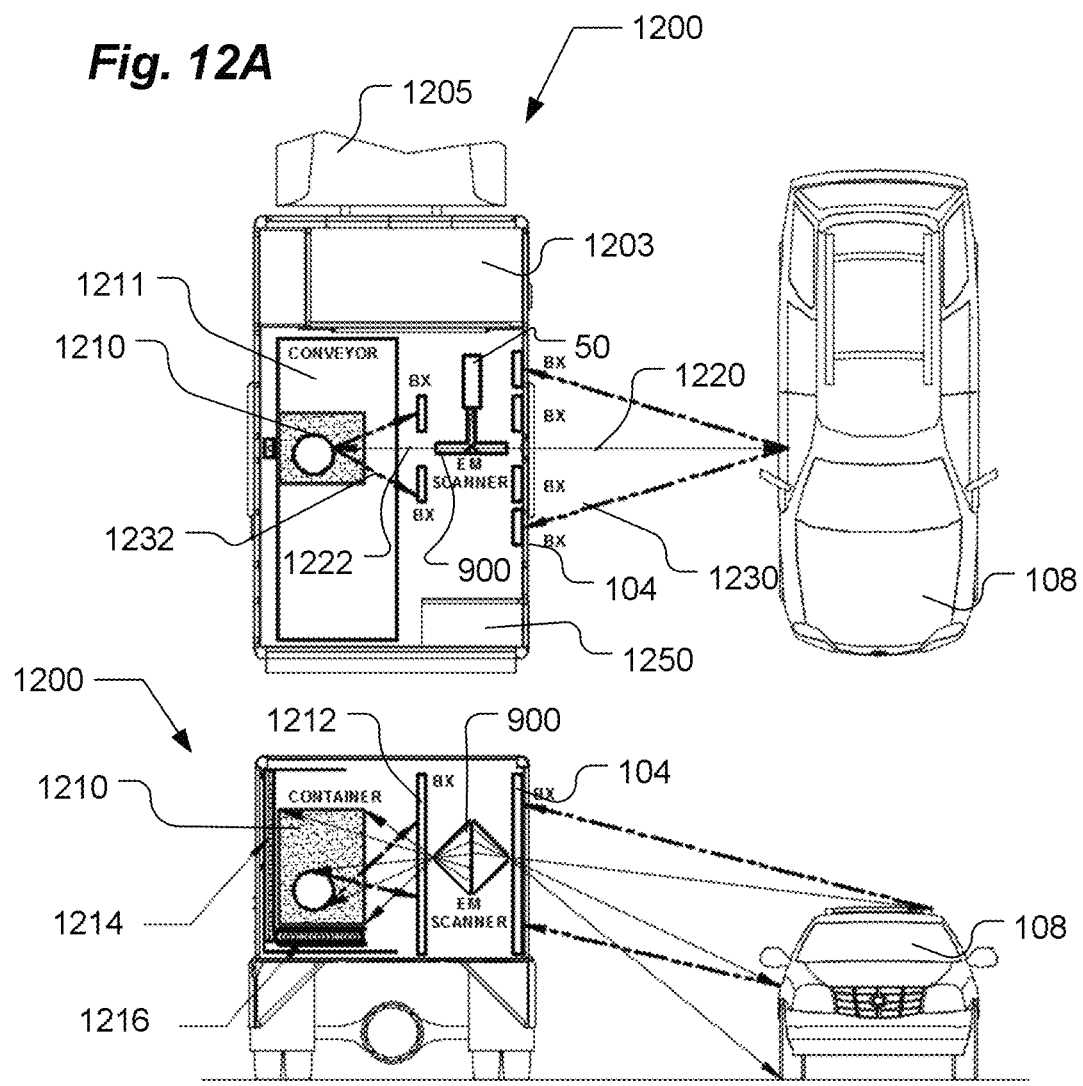
FIGS. 12A and 12B show cross sections in horizontal and vertical planes, respectively, of a mobile combined cargo and vehicle scanner in accordance with an embodiment of the present invention.

Referring now to FIGS. 12A and 12B, cross sections, in horizontal and vertical planes, respectively, are shown of a mobile combined cargo and vehicle scanner 1200. EMS 50 is used in conjunction with bilateral scanning system 900 from within an inspection conveyance 1203, which may be a trailer, for example, pulled by tractor cab 1205. EMS 50 is used in conjunction with bilateral scanning system 900 generate two scanned x-ray beams 1220 and 1222. X-ray beam 1220 is directed outside inspection conveyance 1203 for scanning external inspection target 108, while x-ray beam 1222 is directed to a container 1210 disposed within the inspection conveyance 1203. Such is a configuration is advantageously deployed at small airports, for example, allowing the use of a single inspection conveyance 1203 for inspecting both vehicles and luggage. Thus, container 1210 may include items of baggage, singly or in combination. Container 1210 is conveyed in a direction transverse to the (vertical) plane of x-ray beam 1222 by a mechanical conveyor 1211. Backscattered x-rays 1230 scattered by inspection target 108 are detected by backscatter detectors 104 and processed to produce a first backscatter image. Similarly, backscattered x-rays 1232 scattered by inspected container 1210 are detected by backscatter detectors 1222 and, optionally, by transmission detectors 1214 and 1216, all of which detectors produce signals processed to produce one or more images that may be displayed to an operator. Both scanning processes may be conducted simultaneously by virtue of the EMS protocols and systems taught in accordance with the present invention.

Figure 13A:
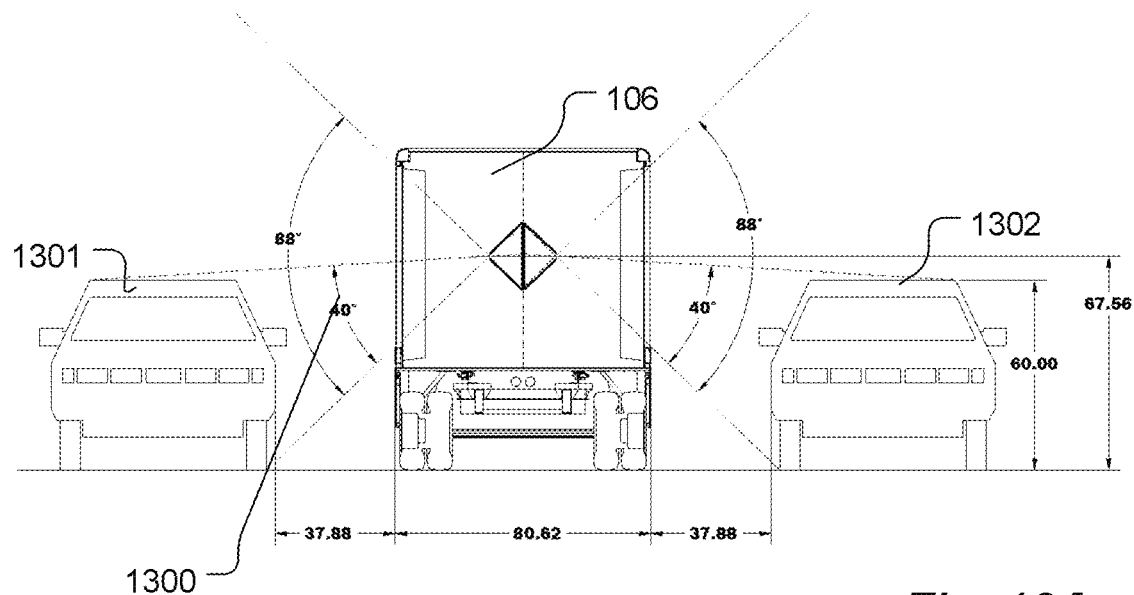
FIGS. 13A and 13B show alternative configurations of scan angles for contemporaneous scanning of pairs of target vehicle of various relative heights, in accordance with embodiments of the present invention.
Figure 13B:
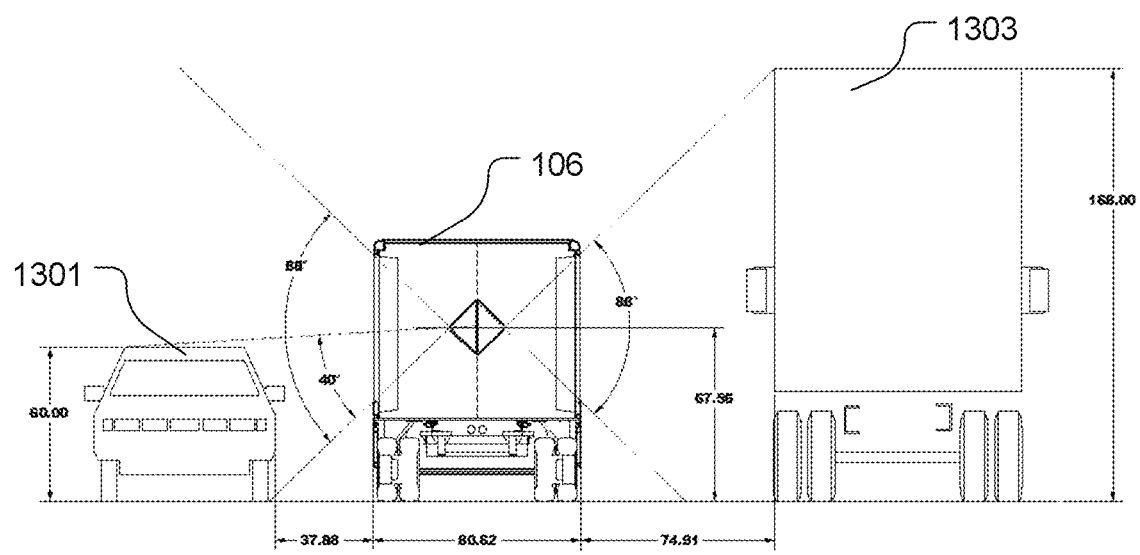

FIGS. 13A and 13B depict various combinations of scan angles 1300 corresponding to scans that may be interleaved, in accordance with the present invention, for scanning a pair of inspected vehicles 1301 and 1302 simultaneously by virtue of the interlinear interleaving of scans in accordance with the present invention. Scan angles 1300 may be adapted to the sensed size of the inspected vehicles, and may be different on respective sides of inspection vehicle 106, as in the case shown in FIG. 13B where inspected vehicles 1301 and 1303 are of different heights.

FIGS. 14A-14C show that, within the scope of the present invention, Rommel aperture 517 may be moved relative to a scanned anode 507 not only in a direction perpendicular to anode 507 (as in FIG. 14A) but additionally along an arcuate path (as in FIG. 14B) or in a path entirely, or with a component, parallel to the direction along which anode 507 is scanned (as in FIG. 14C). This opens various possibilities of corresponding scan angles and central directions of emergent x-rays, as shown.

The described embodiments of the invention are intended to be merely exemplary and numerous variations and modifications will be apparent to those skilled in the art. All such variations and modifications are intended to be within the scope of the present invention as defined in the appended claims.

We claim:

1. An x-ray source comprising:
   a cathode for emitting a beam of electrons;
   a beam controller for varying a direction of the beam of electrons relative to an anode;
   a snout, opaque to transmission of x-rays therethrough, characterized by a first aperture disposed at one apex of the snout and characterized by a variable snout length; and
   a sweep controller for applying a signal to the beam controller in such a manner as to scan the beam of electrons in a prescribed path on the anode, thereby causing an x-ray beam to be emitted from the aperture in a direction that varies as a function of time.

2. The x-ray source in accordance with claim 1, wherein the aperture is a Rommel aperture.

3. The x-ray source in accordance with claim 2, wherein the Rommel aperture is a variable Rommel aperture.

4. The x-ray source in accordance with claim 1, wherein the first aperture is adapted to be varied in position relative to the anode.

5. The x-ray source in accordance with claim 1, wherein the beam controller comprises a steering coil.

6. The x-ray source in accordance with claim 1, further comprising a snout length controller.

7. The x-ray source in accordance with claim 1, further comprising a second aperture for emission of an x-ray beam, adapted such that x-rays may be emitted from the first aperture or the second aperture on the basis of placement of the electron beam on the anode.

8. The x-ray source in accordance with claim 6, further comprising a filter disposed in a channel disposed between the anode and the second aperture.

9. A method for sweeping an x-ray beam across an object of inspection, the method comprising:
   varying a direction of a beam of electrons relative to an anode upon which the beam of electrons impinges;
   coupling x-rays generated at the anode via an aperture disposed at an apex of a snout characterized by a snout length, thereby generating an x-ray beam characterized by a direction scanned as a function of time; and
   adjusting the snout length on a basis of a dimension of the object of inspection.

10. The method in accordance with claim 9, further comprising differentially filtering x-rays emitted through two apertures in the snout.

11. The method in accordance with claim 9, further comprising scanning a first portion of the object of inspection and subsequently scanning a second portion of the object of inspection.

12. The method in accordance with claim 11, wherein the second portion of the object of inspection overlaps the first portion, at least in part.

13. The method in accordance with claim 11, wherein subsequently scanning the second portion of the object of inspection includes scanning at a second sampling rate distinct from a first sampling rate at which the first portion was scanned.

14. The method in accordance with claim 13, wherein the second sampling rate is based, at least in part, on measurements derived during the course of a scan.

15. An x-ray source comprising:
   a cathode for emitting a beam of electrons;
   a controller for varying a direction of the beam of electrons relative to a first anode and a second anode;
   a first snout, opaque to transmission of x-rays therethrough, characterized by a first aperture disposed at one apex of the first snout;
   a second snout, opaque to transmission of x-rays therethrough, characterized by a second aperture disposed at one apex of the second snout; and
   a sweep controller for applying a signal to the beam controller in such a manner as to scan the beam of electrons in a prescribed path on the first and second anodes, thereby causing a first x-ray beam to be emitted from the first aperture in a direction that varies as a first function of time and a second x-ray beam to be emitted from the second aperture in a direction that varies as a second function of time.

16. The x-ray source in accordance with claim 15, wherein the first aperture is a Rommel aperture.

17. The x-ray source in accordance with claim 15, wherein the first aperture is a variable Rommel aperture.

18. The x-ray source in accordance with claim 16, wherein the second aperture is a Rommel aperture.

19. The x-ray source in accordance with claim 18, wherein the first aperture and the second aperture have distinct aperture openings.

20. The x-ray source in accordance with claim 15, further comprising a snout length controller for controlling a length of the first snout.

21. A mobile system for simultaneously inspecting a vehicle and cargo, the mobile system comprising:
   a bilateral scanning system disposed within a conveyance for sweeping a first x-ray beam in a scan path outside the conveyance and a second x-ray beam in a second scan path in a plane within the conveyance;
   a conveyor for moving the cargo through the plane of the second scan path;
   a first detector for detecting x-rays scattered by the vehicle from the first x-ray beam; and
   a second detector for detecting x-rays interacting with the cargo.

* * * * *